United States Patent
Muraki et al.

(10) Patent No.: US 6,429,364 B1
(45) Date of Patent: Aug. 6, 2002

(54) DATA TRANSMITTING/RECEIVING DEVICE AND METHOD

(75) Inventors: Kenji Muraki, Osaka; Satoshi Kondo, Yawata, both of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/581,222

(22) PCT Filed: Nov. 2, 1999

(86) PCT No.: PCT/JP99/06101
§ 371 (c)(1),
(2), (4) Date: Jun. 23, 2000

(87) PCT Pub. No.: WO00/26911
PCT Pub. Date: May 11, 2000

(30) Foreign Application Priority Data

Nov. 2, 1998 (JP) .......................................... 10-311762

(51) Int. Cl.⁷ ................................................. G10H 7/00
(52) U.S. Cl. ........................... 84/600; 709/253; 713/400
(58) Field of Search ................................ 707/101, 102; 455/6.2; 273/148; 708/860; 709/200, 253; 710/5; 713/1, 100, 400; 84/600, 609, 645

(56) References Cited

U.S. PATENT DOCUMENTS

| | | | |
|---|---|---|---|
| 6,085,185 A | * | 7/2000 | Matsuzawa et al. |
| 6,141,702 A | * | 10/2000 | Ludtke et al. |
| 6,226,672 B1 | * | 5/2001 | DeMartin et al. |
| 6,243,725 B1 | * | 6/2001 | Hempleman et al. |
| 6,248,946 B1 | * | 6/2001 | Dwek |

FOREIGN PATENT DOCUMENTS

| | | |
|---|---|---|
| JP | 11025611 | 1/1999 |
| JP | 11073730 | 3/1999 |
| JP | 11110911 | 4/1999 |

OTHER PUBLICATIONS

An English Language abstract of JP 11-110911.
An English Language abstract of JP 11-073730.
An English Language abstract of JP 11-025611.
"AV/C Digital Interface Command Set– General Specification", Version 3.0FC1, published Mar. 29, 1998, pp. 20–24 and 48–59.
"AV/C Disc Subunit Model and Command Set", Version 0.97, published Sep. 25, 1998, pp. 36–86 and 89–112.

* cited by examiner

*Primary Examiner*—Jeffrey Donels
(74) *Attorney, Agent, or Firm*—Greenblum & Bernstein, P.L.C.

(57) ABSTRACT

A data transmission and receiving apparatus and method capable of synchronized playback of plural content and reading descriptors with little processing when accessing from an external device AV data recorded to a recording medium and a descriptor for associated data thereof. An audio list can include a pointer to a title and a pointer to text file information. Link information to a first object of the title list is written to the pointer to the title. Link information to the first object of a second text file list is written to the pointer to the text file information. Access from an external device can be simplified by using such a list structure.

34 Claims, 14 Drawing Sheets

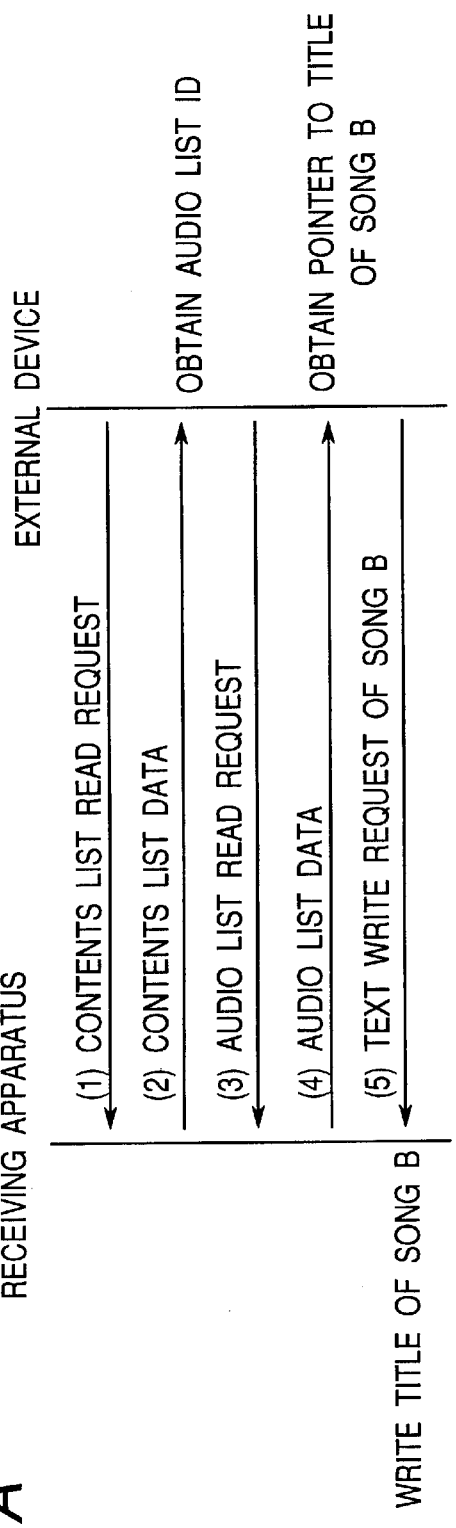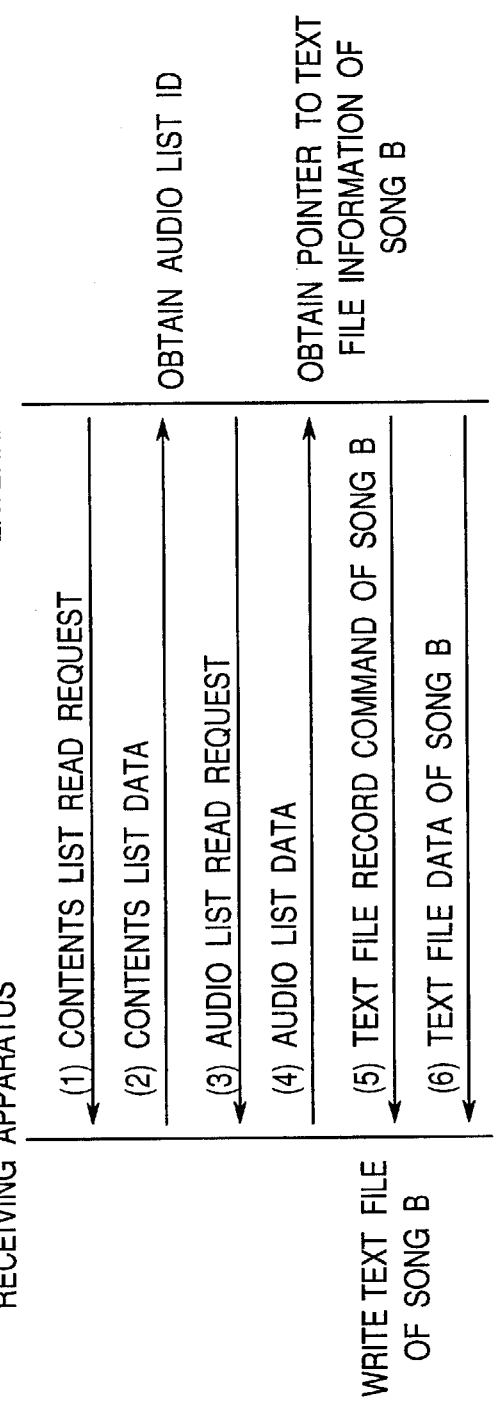
Fig.7A
Fig.7B

DATA TRANSMITTING/RECEIVING DEVICE AND METHOD

TECHNICAL FIELD

The present invention relates to a data transmission and receiving apparatus and method for sending and receiving data recorded to a recording medium such as an optical disc or magnetic tape by way of a digital interface.

BACKGROUND ART

The IEEE 1394 system has attracted attention recently as a serial transmission method for digital data. Not only can the IEEE 1394 system be used in place of the conventional SCSI standard for computer data transmissions, it can also be used for transmitting AV data. This is because two communications methods are defined in the IEEE 1394 system: asynchronous communication and isochronous communication. Isochronous communication is a data transmission method that can be used for transmitting data requiring real-time performance such as AV data. In isochronous communication the bandwidth required for data transmission is obtained before transmission starts. Data is then transmitted using that bandwidth. The real-time characteristic of the data transmission is thereby assured. Asynchronous communication, on the other hand, is a transmission method used for transmitting data that does not require real-time performance, such as transmitting computer data. This can be thought of as equivalent to transmission methods such as the conventional SCSI transmission method.

Various methods have been proposed as high level transmission protocols under the IEEE 1394 system, and one of these can be referred to as the AV protocol. The AV protocol is being standardized as IEC 61883, which defines sending and receiving AV data requiring real-time performance using isochronous communication, and sending and receiving control commands asserted to devices using asynchronous communication.

The AV/C command set is one of the above-noted control command systems. Control commands for VCRs, for example, are defined in the AV/C command set. A method for expressing information stored by the device (such as the device state and recording medium descriptor) using a list structure is also defined in the AV/C command set.

As an example of the prior art, this method is described below with reference to FIG. 13.

FIG. 13 is a schematic diagram showing an example of the list structure defined by the AV/C command set. As shown in the figure, list A 2001 consists of a list header 2002 and zero or more (N shown in the figure) objects 2003. Information relating to list A 2001 overall is written to the list header 2002. The objects 2003 are equivalent, for example, to a unit such as an audio track recorded to a disk; a descriptor relating to each audio track, for example, is written to an object 2003. In addition, a structure with the same concept as the directory of a computer file system can also be used as an object, and can be used to express a list having a hierarchical structure. In FIG. 13 object #3 of list A 2001 is shown as an object indicating a directory, in this example having a list B 2101 as a list for a level under object #3 in list A 2001. This list B 2101 has a list header 2102 and objects 2103 similarly to list A 2001.

These lists are generated inside the device, and can be accessed by an external device by way of IEEE 1394 so that the external device can obtain the information stored by the other device.

When an object contains a descriptor for AV data, for example, AV data recorded to a recording medium can be reproduced by specifying the object ID and sending a play command, for example, to the device. Moreover, if a list is specified and a play command is sent to the device, AV data is reproduced in the order written in the list.

A variety of information can be written using this list structure. For example, devices that use AV discs can write the content recorded to the disc, and the sequence for program playback. The sequence for program playback can also be specified from an external device by accessing the list describing the program playback sequence from an external device.

An example of a title or text file access sequence in a conventional data transmission and receiving apparatus is described below with reference to FIG. 14.

FIG. 14 shows a list structure for a case in which the list shown in FIG. 13 is applied to an optical disc to is recorded an audio track, audio title, or text, for example. FIG. 14 shows a typical content list 1301, audio list 1311, and title list 1351 structure. In this example audio data for two songs, song A and song B, is recorded to the optical disc. In the audio data descriptor, the title information is represented by title list 1351 separately from the content list 1301.

The content list 1301 is a list of the overall content recorded to the optical disc. The content list 1301 contains a first object 1303 and second object 1304. First object 1303 and second object 1304 are objects for presenting a directory; first object 1303 has audio list 1311, and second object 1304 has text file list 1331, as lists one level lower.

Audio list 1311 consists of list header 1312, first object 1313, and second object 1314. In this case, first object 1313 and second object 1314 correspond respectively to the descriptor for songs A and B (not the audio data itself). In addition, the list header 1312 comprises number of songs (number of objects) 1321. In this case the number of songs is two. The first object 1313 and second object 1314 respectively comprise the playback time 1322 and 1324 of each song, and a pointer 1323 and 1325 to each song title.

The text file list 1331 comprises list header 1332, first object 1333, second object 1334, and third object 1335, and stores a text file descriptor. A descriptor relating to a text file includes, for example, the content written to that text file (an identifier indicating a lyrics file or artist information file, for example), the file size, and file creation date and time. In this example the first object 1333 corresponds to a text file representing the entire optical disc, for example, a text file descriptor (not the text file data itself) such as the artist information when the disc records only audio data from a single artist. The second object 1334 and third object 1335 correspond respectively to a text file descriptor (not the text file data itself) for songs A and B. In this case these store a file descriptor relating to a lyrics file and artist information file.

Each object of title list 1351 records the title data itself. In this case it is assumed that a disc title representing the overall audio list is written to first object 1333, the title of song A is written to second object 1354, and the title of song B is written to third object 1355. Link information (an ID for second object 1354) to the second object 1354 of title list 1351 is written in the pointer 1323 to the title in the first object 1313, that is, the object indicating song A in the audio list 1311. Likewise, link information (an ID for the third object 1355) to the third object 1355 of title list 1351 is written in the pointer 1325 to the title in the second object 1314 that is the object indicating song B.

By thus using a list structure with a general format, an external device can access data stored by a data transmission and receiving apparatus by way of a digital interface without knowing the device-specific data storage structure.

For example, when an external device wants to access a disc title in a data transmission and receiving apparatus, it accesses title list 1351 and reads first object 1333. In this case, the first object in the title list is predefined as a disc title. In addition, to access the title of song A, it reads content list 1301, obtains the ID for the audio list, reads the audio list, obtains the pointer 1323 to the title of song A, and based on this accesses the second object 1334 of title list 1351. In this case, if the audio list object can be accessed, the method of accessing the corresponding title information is known mechanically. Furthermore, the second object in the text file list 1331 is accessed to access the text file descriptor corresponding to song A (the first object in the audio list). In this case, too, the second object of text file list 1331 is a descriptor for the text file corresponding to song A (the first object of the audio list) is predefined as the second object of the text file list 1331.

It is therefore possible to access a title or text file descriptor as described above.

DISCLOSURE OF INVENTION (Technical problem to be resolved)

When accessing text files and text information that is attribute data of the AV data from an external device with the above described conventional method, the procedures for accessing text data and text files differ when accessing is by way of following links from an AV data descriptor, and access from an external device is difficult.

More specifically, in the case of a title there is a title information pointer in the AV data descriptor and the title is accessed by following the pointer, but a text file is accessed directly. Moreover, descriptors for individual pieces of song data are written from the first piece in an AV data file object, but with a text file object the first descriptor is for text relating to the entire disc, and the sequence in which descriptors are written is not uniform. As a result, the method of accessing a disc title not corresponding to the individual AV objects is also different from that for titles corresponding to individual AV objects.

Furthermore, with the above noted method, when an external device writes a new title or other information when accessing a text file or text information that is attribute data for AV data, the external device must determine the write location, and the process is complicated.

More specifically, because a title information pointer is in the AV data descriptor, a title can be accessed by following the pointer, but text files are accessed directly. Moreover, the write sequence for AV data file objects and text file objects is nonuniform, and the method of accessing a disc title not corresponding to an individual AV object is also different from a title corresponding to an individual AV object. As a result, a different location must be determined for each write, and the process becomes complicated.

Furthermore, with the above noted conventional method, when AV data is deleted, the external device must delete other objects linked from the object corresponding to the deleted AV data, and the process is complex.

Furthermore, with the above described conventional method, when AV data recorded to a recording medium is divided by a command from an external device, the external device must generate an object for the descriptor corresponding to the newly generated AV data, and the process is complex.

The above described conventional method thus has numerous problems.

The present invention resolves the aforementioned problems of the prior art, and has as an object to provide a data transmission and receiving apparatus and method that can unify the access procedure for text information and text files when accessing by following links from an AV data descriptor when accessing a text file or text information that is attribute data of the AV data from an external device.

A further object of the present invention is to provide a data transmission and receiving apparatus and method whereby it is not necessary for the external device to determine the write location when the external device newly writes title or other information when accessing a text file or text information that is attribute data of the AV data from the external device.

A further object of the present invention is to provide a data transmission and receiving apparatus and method whereby it is not necessary for the external device to delete another object linked from an object corresponding to deleted AV data when AV data is deleted.

A further object of the present invention is to provide a data transmission and receiving apparatus and method whereby it is not necessary for the external device to generate a descriptor object for newly generated AV data when AV data recorded to a recording medium is divided by a command from the external device.

(Method of resolving the problem)

To achieve the above object, the present invention, when mutually converting a list and first descriptor that is descriptor for a content block recorded to a recording medium, groups the first descriptor into a third descriptor expressed independently of the content block and a fourth descriptor other than the third descriptor; generates a first list indicating the fourth descriptor and a second list block indicating the third descriptor; writes a reference to the content block in the third descriptor to the list header of the second list block; and writes link information to a reference to the content block in the third descriptor to the list header of the first list.

As a result, the procedure for accessing a reference to the content block in the third descriptor can be made easy.

(Improvement over the prior art)

In this way, in a data transmission and receiving apparatus and method according to the present invention, a recording medium descriptor is expressed using a list structure when accessing by way of a digital interface a recording medium to which is recorded AV data or text data such as titles for the AV data. For the list structure, a list is generated for the AV data descriptor and text data descriptor, and a pointer to a list of related text data descriptor is written to the AV data list object. As a result, text information that is attribute data of the AV data can be accessed from an external device by following links from the AV data descriptor, and simplified access from an external device can be promoted.

Furthermore, a recording medium descriptor is expressed using a list structure with the present invention when accessing by way of an intervening digital interface a recording medium to which is recorded AV data, text data such as a title for the AV data, and a text file such as lyrics for the AV data. For the list structure, an individual list is generated for the AV data descriptor, text data, descriptor for the text file representing the AV data overall, and descriptor for other text files, and a pointer to a list of related text data and text file descriptors is written to the AV data list object. It is thus possible to access text files and text information that are attribute data of the AV data from an external device by following links from the AV data descriptor. In addition, because a descriptor for a text file representing all of the AV data is stored in a separate file, and the list storing a descriptor for the text information associated with the individual AV data and other text files is written with the same structure as the list in which an AV data descriptor is stored, text information and text files can be accessed from an external device using the same procedure, and access from an external device can be simplified.

Furthermore, with the present invention, a recording medium descriptor is expressed using a list structure when accessing by way of a digital interface a recording medium to which is recorded AV data, text data such as titles for the AV data, or a text file such as lyrics for the AV data. For the list structure, an individual list is generated for the AV data descriptor, text data, and a text file descriptor, and a pointer to a list of related text data and text file descriptors is written to the AV data list object. If text data corresponding to the AV data is not recorded to the recording medium at this time, the objects in the lists for the text data, etc., are left empty. As a result, text files and text information that are attribute data of the AV data can be accessed from an external device by following links from the AV data descriptor. In addition, because text information and text files are written using the same structure, text information and text files can be accessed from an external device using the same procedure, and access from an external device can be simplified. Furthermore, because empty objects are generated even if the title or other text information is not recorded to the recording medium at this time, the write location can be determined in advance when an external device newly writes a title or other information.

Furthermore, with the present invention, a recording medium descriptor is expressed with a list structure when accessing by way of a digital interface a recording medium to which is recorded AV data, text data such as titles for the AV data, or a text file such as lyrics for the AV data. For the list structure, an individual list is generated for the AV data descriptor, text data, and a text file descriptor, and a pointer to a list of related text data and text file descriptors is written to the AV data list object. Then, when AV data is deleted, the object(s) in the title list and object(s) in the text file linked from the object corresponding to the deleted AV data are deleted at the same time. As a result, text files and text information that are attribute data of the AV data can be accessed from an external device by following links from the AV data descriptor. In addition, because text information and text files are written using the same structure, text information and text files can be accessed from an external device using the same procedure, and access from an external device can be simplified. Furthermore, when AV data is deleted in this case, it is not necessary for the external device to delete a descriptor corresponding to the deleted AV data or descriptor (text information or text file) because objects in the title list and objects in the text files linked from the object corresponding to the deleted AV data are deleted at the same time, and uniform list management can be facilitated. In addition, content recorded to the recording medium can be immediately reflected in the list.

Furthermore, with the present invention, a recording medium descriptor is expressed using a list structure when accessing by way of a digital interface a recording medium to which is recorded AV data, text data such as titles for the AV data, or a text file such as lyrics for the AV data. For the list structure, an individual list is generated for the AV data descriptor, text data, and a text file descriptor, and a pointer to a list of related text data and text file descriptors is written to the AV data list object. Then, when AV data is divided, a descriptor for the text data and text file corresponding to the divided newly generated AV data is added to the text data and text file descriptor list as a new object. Then, link information to the newly generated text data and text file descriptor object is written to the object corresponding to the newly generated AV data. As a result, text files and text information that are attribute data of the AV data can be accessed from an external device by following links from the AV data descriptor. In addition, because text information and text files are written using the same structure, text information and text files can be accessed from an external device using the same procedure, and access from an external device can be simplified. Furthermore, when AV data is divided, an object in the title list and an object in the text file are generated for the divided newly generated AV data, and a link is made from the newly generated AV data object. Therefore, even when AV data recorded to a recording medium is divided by a command from an external device, it is not necessary for the external device to generate a descriptor for the newly generated AV data or objects corresponding to the descriptor (text information and text file), and uniform list management and simplified processing can be promoted.

Furthermore, with the present invention, a recording medium descriptor is expressed with a list structure when accessing by way of a digital interface a recording medium to which AV data and still image data, for example, are recorded. For the list structure, individual lists are generated for the descriptors of the AV data, still image data representing the disc, and other still image data. Furthermore, when a playback command specifying an AV data list is sent from an external device, playback starts from the AV data corresponding to the first object at the beginning of the AV data list. As a result, because data blocks not associated with AV data are managed using the same method described in the second embodiment for data associated with AV data, list structure uniformity can be promoted, and simplified access can be facilitated when this data or descriptor for this data is accessed from an external device. Furthermore, synchronized playback of AV data, data associated therewith, and data not associated therewith can be easily accomplished because the list formats are the same.

BRIEF DESCRIPTION OF DRAWINGS

FIGS. 7A and 7B are schematic diagrams showing data communication in this same data transmission and receiving apparatus and method.

BEST MODE FOR CARRYING OUT THE INVENTION

Figure 1:
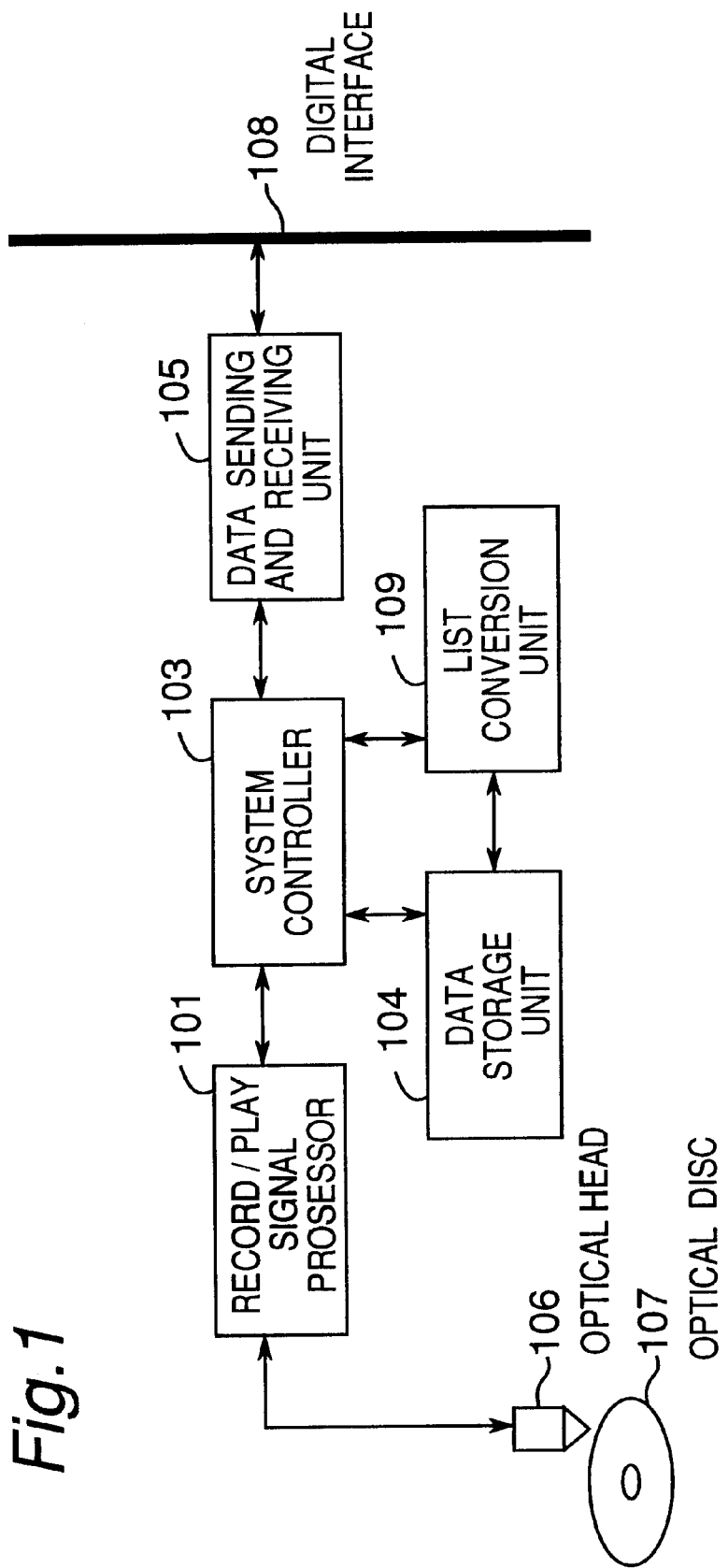
FIG. 1 is a block diagram showing the configuration of a data transmission and receiving apparatus and method according to a first embodiment of the present invention.

A first aspect of the present invention is a data transmission and receiving apparatus and method for sending and receiving data through an intervening digital interface, comprising a data storage means for accumulating a first descriptor, which is a descriptor for a content block recorded to a recording medium, a list conversion means for mutually converting a list and descriptor stored by the data storage means, and a data transmission and receiving means for sending and receiving a list converted by the list conversion means through the digital interface; wherein the list conversion means groups the first descriptor into a third descriptor expressed independently of the content block, and fourth descriptor other than the third descriptor, generates a first list indicating the fourth descriptor and a second list block indicating the third descriptor, writes a reference to the content block in the third descriptor to a list header of the second list block, and writes link information to the reference to the content block in the third descriptor to a list header of the first list.

Furthermore, a second aspect of the present invention is a data transmission and receiving apparatus and method for sending and receiving data through an intervening digital interface, comprising a data storage means for accumulating a first descriptor, which is a descriptor for a first content block recorded to a recording medium, and second descriptor, which is a descriptor for a second content block associated with the first content block, a list conversion means for mutually converting a list and first and second descriptor stored by the data storage means, and a data transmission and receiving means for sending and receiving a list converted by the list conversion means through the digital interface; wherein the list conversion means groups the first descriptor into a third descriptor expressed independently of the first content block, and fourth descriptor other than the third descriptor, respectively divides the second to fourth descriptors into object units corresponding to individual pieces of content, generates a first list consisting of the fourth descriptor object block, a second list block consisting of the third descriptor object block, a third list consisting of an object representing the content block in the second descriptor object block, and a fourth list block consisting of other objects, and writes to an object in the first list link information to an object in the second list containing the third descriptor for content corresponding to an object in the first list, and an object in the fourth list containing the second descriptor for content corresponding to an object in the first list.

Furthermore, a third aspect of the present invention is a data transmission and receiving apparatus and method for sending and receiving data through an intervening digital interface, comprising a data storage means for accumulating a first descriptor, which is a descriptor for a first content block recorded to a recording medium, and second descriptor, which is a descriptor for a second content block associated with the first content block, a list conversion means for mutually converting a list and first and second descriptor stored by the data storage means, and a data transmission and receiving means for sending and receiving a list converted by the list conversion means through the digital interface; wherein the list conversion means groups the first descriptor into a third descriptor expressed independently of the first content block, and fourth descriptor other than the third descriptor, respectively divides the second to fourth descriptors into object units corresponding to individual pieces of content, generates an empty object when said second to fourth descriptors do not exist at said separation, generates a first list consisting of the fourth descriptor object block, a second list block consisting of the third descriptor object block, a third list consisting of an object representing the content block in the second descriptor object block, and a fourth list block consisting of other objects, and writes to an object in the first list link information to an object in the second list containing the third descriptor for content corresponding to an object in the first list, and an object in the fourth list containing the second descriptor for content corresponding to an object in the first list.

Furthermore, a fourth aspect of the present invention is a data transmission and receiving apparatus and method for sending and receiving data through an intervening digital interface, comprising a data storage means for accumulating a first descriptor, which is a descriptor for a first content block recorded to a recording medium, and second descriptor, which is a descriptor for a second content block associated with the first content block, a list conversion means for mutually converting a list and first and second descriptor stored by the data storage means, and a data transmission and receiving means for sending and receiving a list converted by the list conversion means through the digital interface; wherein the list conversion means groups the first descriptor into a third descriptor expressed independently of the first content block, and fourth descriptor other than the third descriptor, respectively divides the second to fourth descriptors into object units corresponding to individual pieces of content, generates a first list consisting of the fourth descriptor object block, a second list block consisting of the third descriptor object block, a third list consisting of an object representing the content block in the second descriptor object block, and a fourth list block consisting of other objects, writes to an object in the first list link information to an object in the second list containing the third descriptor for content corresponding to an object in the first list, and an object in the fourth list containing the second descriptor for content corresponding to an object in the first list, and when a first content in the content block is deleted, deletes the object in the first list indicating the first content descriptor, and the object in the second list and the object in the fourth list linked from the object in the first list.

Furthermore, a fifth aspect of the present invention is a data transmission and receiving apparatus and method for sending and receiving data through an intervening digital interface, comprising a data storage means for accumulating a first descriptor, which is a descriptor for a first content block recorded to a recording medium, and second descriptor, which is a descriptor for a second content block associated with the first content block, a list conversion means for mutually converting a list and first and second descriptor stored by the data storage means, and a data transmission and receiving means for sending and receiving a list converted by the list conversion means through the digital interface; wherein the list conversion means groups the first descriptor into a third descriptor expressed independently of the first content block, and fourth descriptor other than the third descriptor, respectively divides the second to fourth descriptors into object units corresponding to individual pieces of content, generates a first list consisting of the fourth descriptor object block, a second list block consisting of the third descriptor object block, a third list consisting of an object representing the content block in the second descriptor object block, and a fourth list block consisting of other objects, writes to an object in the first list link information to an object in the second list containing the third descriptor for content corresponding to an object in the first list and to an object in the fourth list containing the second descriptor for content corresponding to an object in the first list, and when first content in the content block is divided into second and third content, divides a first object in the first list indicating the fourth descriptor for the first content into second and third objects, divides an object in the second list linked from the first object into fourth and fifth objects, divides an object in the fourth list linked from the first object into sixth and seventh objects, writes link information to the fourth and sixth objects in the second object, and writes link information to the fifth and seventh objects in the third object.

Furthermore, a sixth aspect of the present invention is a data transmission and receiving apparatus and method for sending and receiving data through an intervening digital interface, comprising a data storage means for accumulating descriptors of a content block recorded to a recording medium, a list conversion means for mutually converting a list and descriptor stored by the data storage means, and a data transmission and receiving means for sending and receiving a list converted by the list conversion means through the digital interface; wherein the list conversion means groups the descriptors into object units corresponding to individual pieces of content, and generates a first list consisting of an object block of descriptors corresponding to content representing the content block, and a second list consisting of an object block of other descriptor.

The preferred embodiments of the present invention are described below using the accompanying figures.

Embodiment 1

A data transmission and receiving apparatus and method according to a first embodiment of the present invention is described with reference to accompanying figures. This preferred embodiment is an example of a data transmission and receiving apparatus and method according to a first aspect of the present invention.

In the following description, audio data is used by way of example as the content block recorded to the recording medium. Furthermore, the audio data playback time, title, and audio data count (number of songs) are used by way of example as the first descriptor that is the descriptor for the audio data. This data is typically recorded to the recording medium as a TOC (table of contents). Furthermore, title information is used by way of example as the third descriptor; the playback time of each song as the fourth descriptor; an audio list as the first list; a title list as the second list block (there is only one title list in this embodiment, but in general there may be plural lists); and a disc title as representative of the content of the third descriptor.

FIG. 1 is a block diagram of a data transmission and receiving apparatus comprising a record/play signal processor 101, system controller 103, data storage unit 104, data sending and receiving unit 105, optical head 106, optical disc 107, digital interface 108, and list conversion unit 109.

Operation of the data transmission and receiving apparatus in FIG. 1 is described next. It is here assumed that audio data, data associated with audio data, and descriptors for these data are recorded to optical disc 107. When a optical disc 107 is loaded, the data transmission and receiving apparatus in FIG. 1 reproduces the descriptor data. The reproduced data is demodulated and ECC decoded by record/play signal processor 101, and input to system controller 103. The descriptor data input to the system controller 103 is input to data storage unit 104, and is stored by data storage unit 104.

Descriptor data stored by data storage unit 104 includes the audio data playback time, title, and audio data count (number of songs).

What happens when an audio data descriptor for the optical disc 107 is input and output through digital interface 108 from the external device is described here. Descriptor input/output is accomplished by expressing the descriptor using a list structure and accessing the list (reading, writing).

When a command packet for reading an audio data descriptor recorded to optical disc 107 is input to data sending and receiving unit 105 from an external device through digital interface 108, the data sending and receiving unit 105 interprets the header, etc., of the command packet, and inputs the command to system controller 103. When the system controller 103 receives a read command, it outputs the descriptor stored to data storage unit 104 to the list conversion unit 109. When the list conversion unit 109 receives descriptor from data storage unit 104, it converts it to a predefined list structure and outputs to system controller 103. The system controller 103 outputs the list input from system controller 103 to data sending and receiving unit 105, the data sending and receiving unit 105 adds a header, etc., to the list, and outputs to the digital interface 108.

When a packet containing a command for writing a descriptor for audio data recorded to optical disc 107 is input to data sending and receiving unit 105 from an external device through digital interface 108, the data sending and receiving unit 105 interprets the packet header, etc., and inputs the command to the system controller 103. When the system controller 103 receives a write command, it performs the write operation written in the write command on the list stored by the list conversion unit 109. It then applies the change applied to list conversion unit 109 to the descriptor stored in data storage unit 104. When a optical disc 107 is ejected, for example, system controller 103 reads the descriptor stored to data storage unit 104, and records to optical disc 107 by way of record/play signal processor 101.

Figure 2:
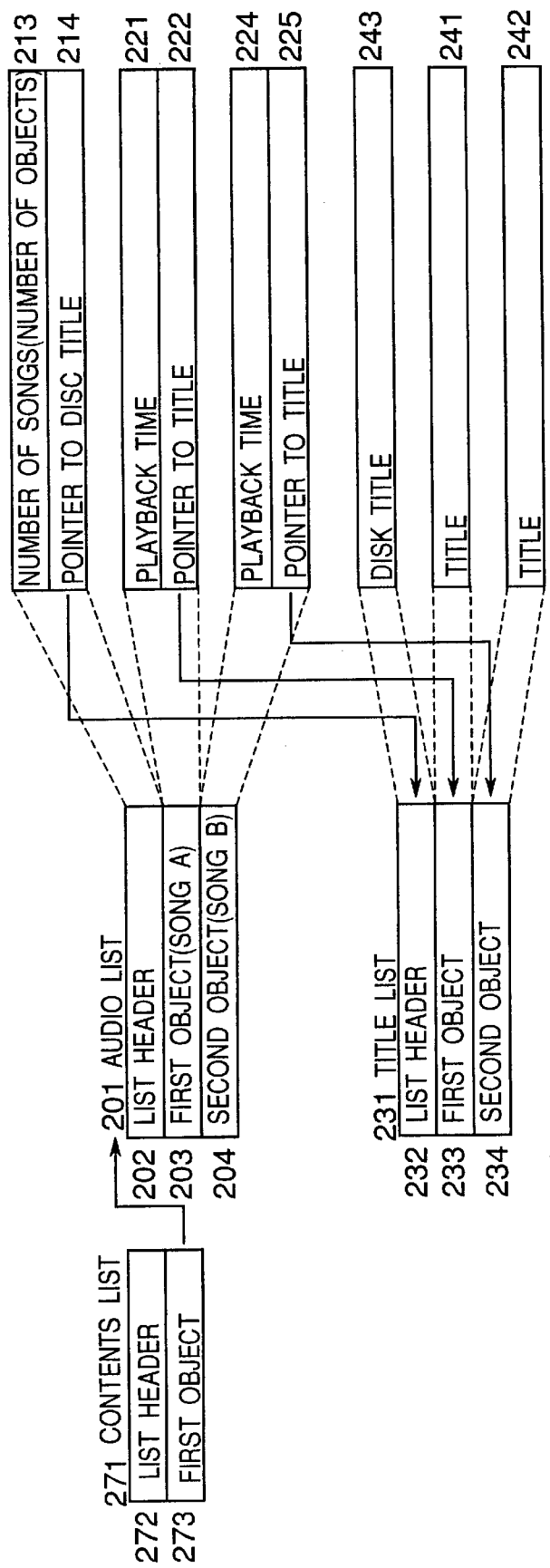
FIG. 2 is a schematic diagram of the list structure in the same data transmission and receiving apparatus and method.

The structure of a list generated by list conversion unit 109 is shown in FIG. 2. FIG. 2 is a schematic diagram showing the structure of contents list 271, audio list 201, and title list 231. It is here assumed that audio data for two songs, songs A and B, is recorded to optical disc 107. It is here further assumed that of the audio data descriptor, the title information is expressed by title list 231 independently of contents list 271.

The contents list 271 is a list of the entire content recorded to optical disc 107. The contents list 271 contains a first object 273. The first object 273 is a directory object, and possesses audio list 201 as a list one hierarchical level lower.

Title list 231 is a list independent of contents list 271. While only one title list is shown in this present embodiment, if the optical disc 107 has plural titles corresponding to plural languages, an independent list can be prepared for each language. In this case it is also possible for the structure to consist of a child list for each language descending from a parent list similarly to the contents list.

The audio list 201 consists of a list header 202, first object 203, and second object 204. In this example first object 203 and second object 204 correspond respectively to a descriptor for songs A and B (not the audio data itself). The list header 202 comprises the number of songs (number of objects) 213, and a pointer 214 to the disc title. In this example there are two songs. Furthermore, first object 203 and second object 204 respectively comprise playback time 221 and 224 for each respective song, and a pointer 222 and 225 to the title of each song.

Each object in title list 231 records the title data itself. It is here assumed that a disc title representing the overall audio list is written to the list header, the title for song A is written to first object 233, and the title for song B is written to second object 234. Link information (ID) to list header 232 of title list 231 is written to the pointer 214 to the disc title in the list header of audio list 201. Link information (first object 233 ID) to first object 233 of title list 231 is written to the pointer 222 to the title in the first object 203, that is, the object indicating song A. Likewise, link information (second object 234 ID) to the second object 234 of title list 231 is written to the pointer 225 to the title in second object 204, that is, the object indicating song B.

Figure 3:
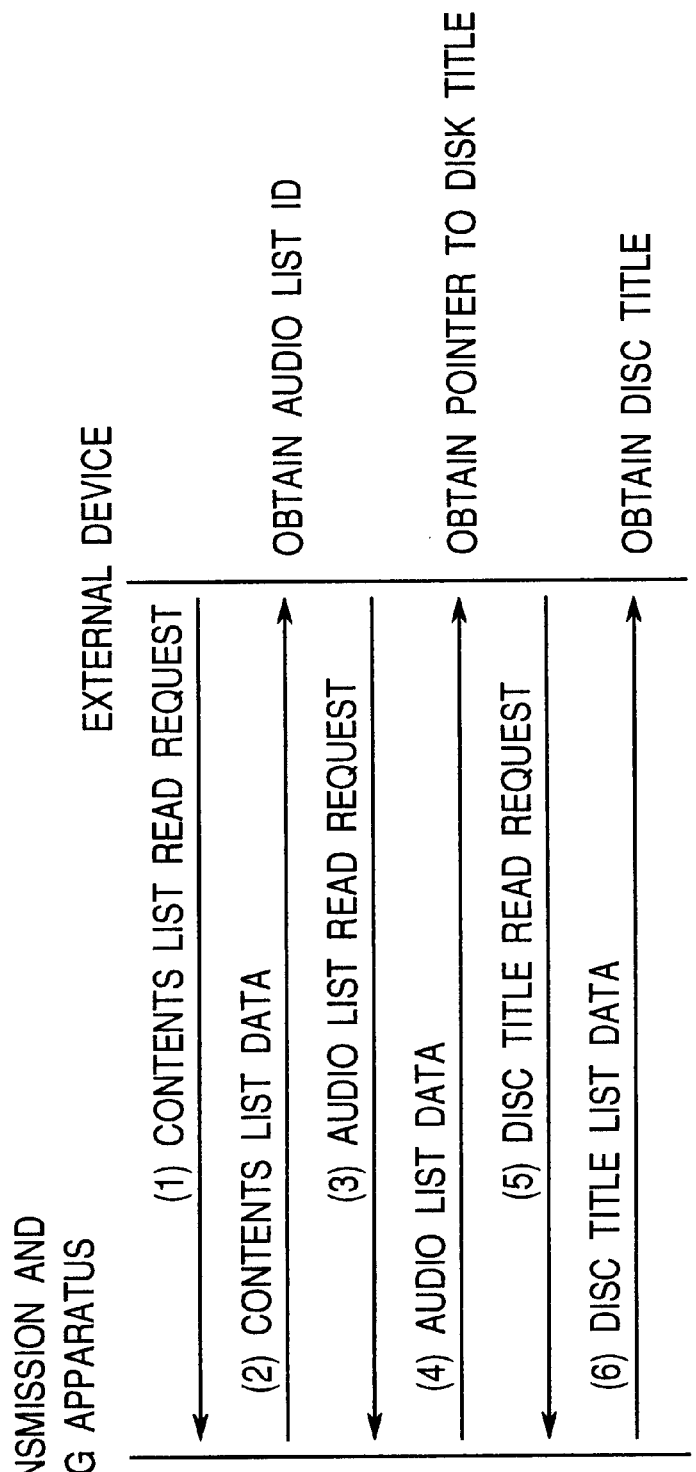
FIG. 3 is a schematic diagram showing data communication in this same data transmission and receiving apparatus and method.

As a result, an external device can search by way of digital interface 108 from the object of the audio list stored by the data transmission and receiving apparatus for the title corresponding to that object (song). Data communication for when an external device wants to access a disc title in a data transmission and receiving apparatus according to the present invention is shown by way of example in FIG. 3. (1) First, a request to read contents list 271 is sent from the external device to the data transmission and receiving apparatus. (2) In response, the data transmission and receiving apparatus reads contents list 271 and sends it to the external device. As a result, the external device obtains the audio list ID. (3) Then, based on the audio list ID, the external device issues an audio list 201 read request. (4) The data transmission and receiving apparatus reads and sends audio list 201. The external device obtains pointer 214 to the disc title. (5) Then, based on this pointer 214, the external device sends a request to read disc title 243 stored in list header 232 of title list 231. (6) The data transmission and receiving apparatus thus reads and sends the disc title 243 to the external device. An external device is thus able to access a disc title.

In this way, in a data transmission and receiving apparatus according to the present invention, a recording medium descriptor is expressed using a list structure when accessing by way of a digital interface a recording medium to which is recorded AV data or text data such as titles for the AV data. For the list structure, a list is generated for the individual descriptor for AV data and text data, and a pointer to a list of related text data descriptor is written to the AV data list object.

By using a data transmission and receiving apparatus according to the present invention in this way, text information that is attribute data of the AV data can be accessed from an external device by following links from the AV data descriptor.

Embodiment 2

A data transmission and receiving apparatus according to a second embodiment of the present invention is described with reference to FIG. 1 and FIG. 4. This embodiment of the present invention is an example of a data transmission and receiving apparatus and method according to a second aspect of the present invention.

Furthermore, the second to fifth embodiments are described below using audio data as the first content block recorded to the recording medium, and as the descriptor therefor the audio data playback time, title, and number of audio data (number of songs) are used by way of example as the first descriptor that is the descriptor for the audio data. These are normally recorded to the recording medium as a TOC (table of contents). In addition, a text data file is used by way of example as the second content block; the relationship between audio data and a text data file (information indicating what text data file is associated with which audio data) and the text data file size, etc., is used as the second descriptor; title information is used as the third descriptor; the playback time of each song is used as the fourth descriptor; an audio list is used as the first list; a title list (there is only one title list in the present embodiment, but there are commonly plural lists) is used as the second list block; a first text file list is used as the third list; a second text file list is used as the fourth list; and a disc title is used as representing the content of the third descriptor.

The basic operation of the data transmission and receiving apparatus shown in FIG. 1 is identical to the first embodiment. A text data file containing lyrics and artist information is recorded as data belonging with the audio data recorded to optical disc 107.

It is further assumed that the audio data playback times title, audio data number (number of songs), relationship between the audio data and text data file (information indicating what text data file is associated with data), and the text data file size are used as the descriptor data stored by data storage unit 104.

Figure 4:
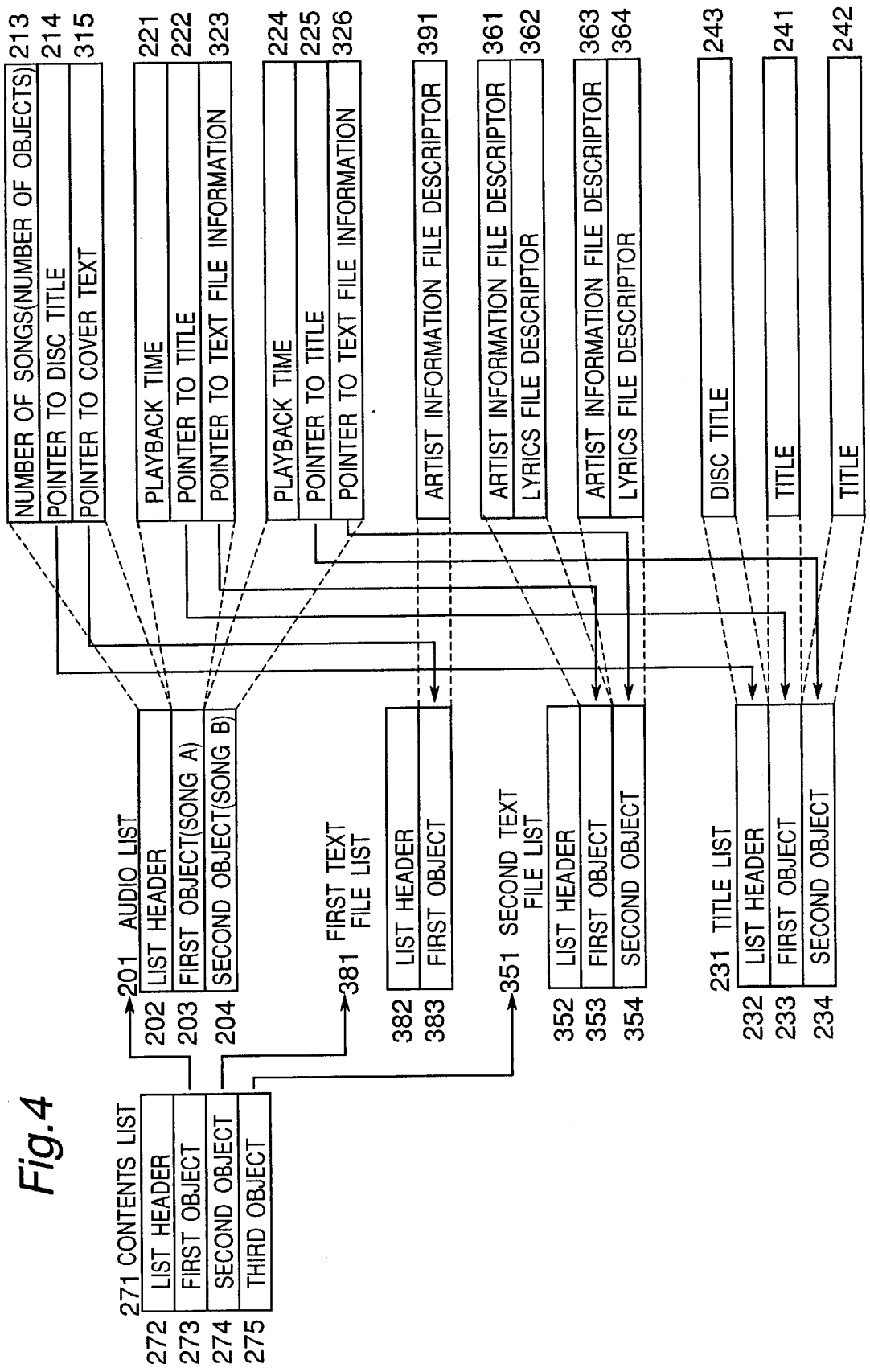
FIG. 4 is a schematic diagram of the list structure in a data transmission and receiving apparatus and method according to a second embodiment of the present invention.

The structure of a list generated by list conversion unit 109 is shown in FIG. 4. FIG. 4 is a schematic diagram showing the structure of the contents list 271, audio list 201, title list 231, first text file list 381, and second text file list 351. It is here assumed that audio data for two songs, songs A and B. is recorded to optical disc 107. Of the audio data descriptor, title information is expressed by title list 231 independently of contents list 271.

The contents list 271 is a list of the entire content recorded to optical disc 107. The contents list 271 contains first to third objects 273 to 275. First to third objects 273 to 275 are directory objects, and respectively have audio list 201, first text file list 381, and second text file list 351 as a list one hierarchical level lower.

The audio list 201 consists of a list header 202, first object 203, and second object 204. In this example first object 203 and second object 204 correspond respectively to descriptors for songs A and B (not the audio data itself). The list header 202 comprises the number of songs (number of objects) 213, a pointer 214 to the disc title, and cover text 315. In this example there are two songs. Furthermore, first object 203 and second object 204 respectively comprise playback time 221 and 224 for each respective song, a pointer 222 and 225 to the title of each song, and a pointer 323 and 326 to the text file of each song.

Each object in title list 231 records the title data itself. It is here assumed that a disc title representing the overall audio list is written to the list header, the title for song A is written to first object 233, and the title for song B is written to second object 234. Link information (ID) to list header 232 of title list 231 is written to the pointer 214 to the disc title in the list header of audio list 201. Link information (first object 233 ID) to first object 233 of title list 231 is written to the pointer 222 to the title in the first object 203, that is, the object indicating song A. Likewise, link information (second object 234 ID) to the second object 234 of title list 231 is written to the pointer 225 to the title in second object 204, that is, the object indicating song B.

As a result, an external device can search by way of digital interface 108 from an object of an audio list stored by the data transmission and receiving apparatus for the title corresponding to that object (song). For example, for an embodiment to access the title of song B, it first reads the contents list 271 and obtains the ID of the audio list. Then, based on the audio list ID, it reads the audio list 201 and obtains the pointer 225 to the title of song B. Next, based on this pointer 225, it can access the second object 234 of title list 231, that is, the title 242 of song B.

A descriptor relating to a text file (not the data of the text file itself) representing the overall disk is stored to first text file list 381. This is, for example, a text file of artist information when only audio data produced by a single artist is recorded. This type of text file is used for reproduction when the disc is stopped, for example. Link information (first object 383 ID) to the first object 383 of the first text file list 381 is recorded to the pointer 315 to the cover text file in the list header 202 of the audio list 201.

A descriptor (not the text file data itself) relating to the text file is written to each object of the second text file list 351. This descriptor relating to a text file includes, for example, the content written to the text file (an identifier indicating whether it is a lyrics file or artist information file), file size, file creation date and time, or other information. In this example, information relating to the text file for song A is written to first object 353, and information relating to the text file for song B is written to second object 354. Link information (first object 353 ID) to the first object 353 of second text file list 351 is then written to pointer 323 to the text file information in the first object 203, which is an object indicating song A in audio list 201. In addition, link information (second object 354 ID) to the second object 354 of second text file list 351 is written to the pointer 326 to the text file information in second object 204 that is the object indicating song B.

Figure 5:
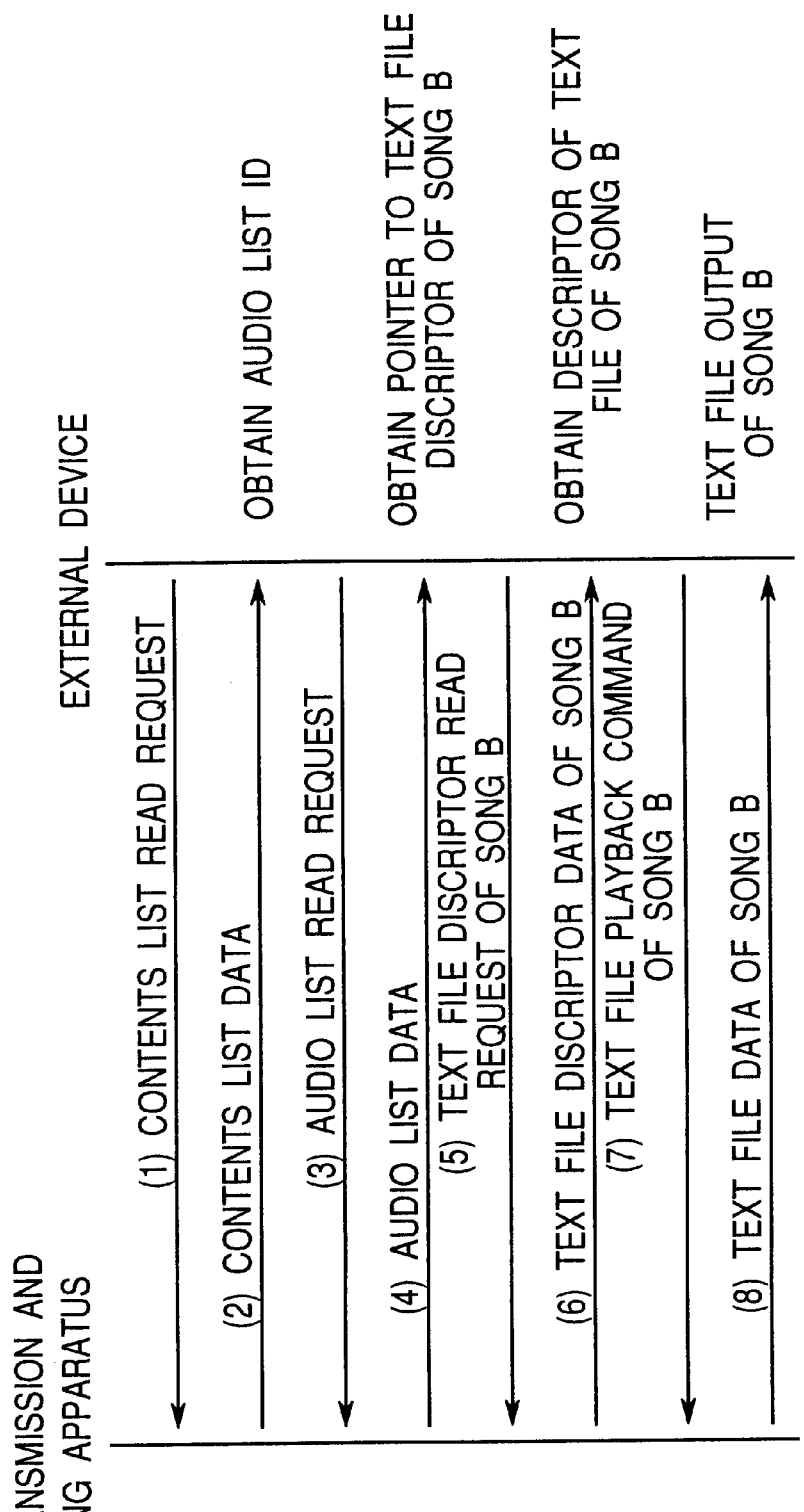
FIG. 5 is a schematic diagram showing data communication in this same data transmission and receiving apparatus and method.

As a result, an external device can, by way of digital interface 108, search from an object in an audio list stored by the data transmission and receiving apparatus for text file information corresponding to that object (song). Data exchange between an external device and data transmission and receiving apparatus when the external device wants to access the descriptor for the lyrics file for song B is shown in FIG. 5. First, it reads the contents list 271 and obtains the audio list ID ((1), (2)). Then, based on the audio list ID, it reads the audio list 201 and obtains a pointer 326 to the text file information for song B ((3), (4)). Then, based on this pointer 326, it can access the descriptor 364 for the lyrics file of song B written in the second object 354 of the second text file list 351 ((5), (6)). In addition, when data is to be reproduced from the lyrics file or artist information file and output, the data can be output (8) by specifying an object in the second text file list 351 and sending a play command (data output command) from the external device to the data transmission and receiving apparatus (7).

In this way, in a data transmission and receiving apparatus according to the present invention, a recording medium descriptor is expressed using a list structure when accessing by way of a digital interface a recording medium to which is recorded AV data, text data such as titles for the AV data, or a text file such as lyrics for the AV data. For the list structure, an individual list is generated for the AV data descriptor, text data, descriptor for the text file representing the AV data overall, and descriptor for other text files, and a pointer to a list of related text data and text file descriptors is written to the AV data list object.

By using a data transmission and receiving apparatus according to the present invention in this way, text files and text information that are attribute data of the AV data can be accessed from an external device by following links from the AV data descriptor. In addition, because a descriptor for a text file representing all of the AV data is stored in a separate file, and the list storing a descriptor for the text information associated with the individual AV data and other text files is written with the same structure as the list in which AV data descriptor is stored, text information and text files can be accessed from an external device using the same procedure, and access from an external device can be simplified.

Embodiment 3

A data transmission and receiving apparatus according to a third embodiment of the present invention is described with reference to FIG. 1 and FIG. 6. This embodiment of the present invention is an example of a data transmission and receiving apparatus and method according to a third aspect of the present invention. In addition, the basic operation of the data transmission and receiving apparatus in FIG. 1 is the same as that of the first embodiment.

Figure 6:
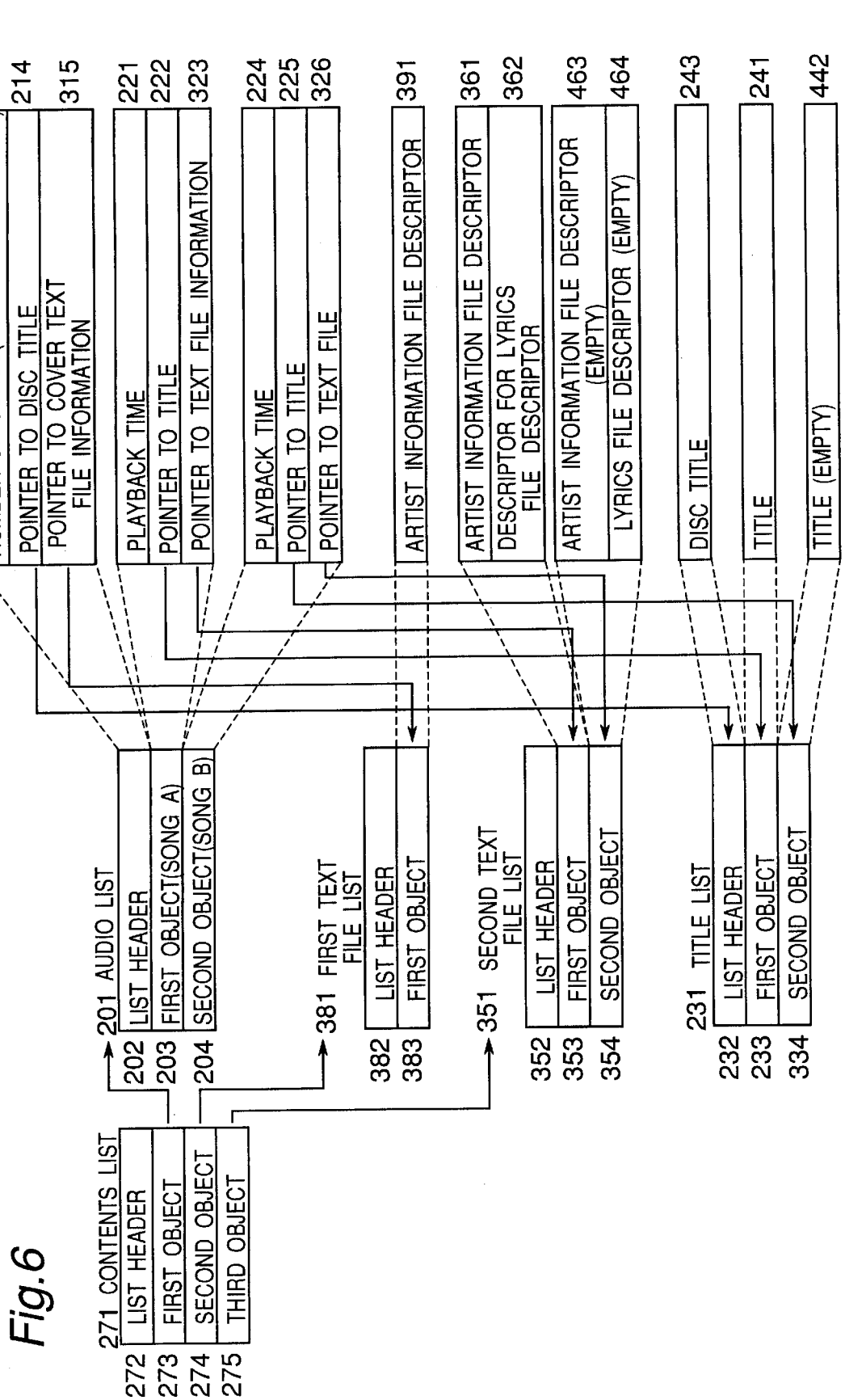
FIG. 6 is a schematic diagram of the list structure in a data transmission and receiving apparatus and method according to a third embodiment of the present invention.

The structure of a list generated by list conversion unit 109 is shown in FIG. 6. FIG. 6 is a schematic diagram showing the structure of the contents list 271, audio list 201, title list 231, first text file list 381, and second text file list 351. It is here assumed that audio data for two songs, songs A and B, is recorded to optical disc 107.

The basic structure of the contents list 271, audio list 201, title list 231, first text file list 381, and second text file list 351 is the same as in the second embodiment. Operation of this third embodiment, is describe with reference to a case in which song B is recorded to optical disc 107, but the title information and text file for song B are not recorded.

In this case, second object 334, that is, an object corresponding to song B, is present in the title list 231, but the object is empty with no content (title 442) written thereto.

A case in which an external device writes the title for song B is described here with reference to FIG. 7(a). First, it reads the contents list 271 and obtains the audio list ID ((1), (2)). Then, based on the audio list ID, it reads the audio list 201 and obtains a pointer 225 to the title for song B ((3), (4)). As a result, it is known that the title for song B must be written to the second object 234 of title list 231.

The external device then writes the desired title to the second object 234 of title list 231 (5). It is thus possible for a title 442 for a song B recorded to the optical disc 107 to be added from an external device.

In addition, second object 354, an object corresponding to song B, is present in the second text file list 351, but is empty with no content (descriptor 463 for the artist information file and descriptor 464 for the lyrics file) written therein. A case in which an external device writes the lyrics file descriptor is described here with reference to FIG. 7 (b).

First, it reads the contents list 271 and obtains the audio list ID ((1), (2)). Then, based on the audio list ID, it reads the audio list 201 and obtains a pointer 326 to the text file information for song B ((3), (4)). As a result, it is known that the text file information for song B must be written to the second object 354 of the second text file list 351. Data can then be entered (6) by the external device specifying the second text file list 351 object and issuing a record command (data input command) to the data transmission and receiving apparatus.

It should be noted that access to the second text file list 351 is described here, but access to the first text file list 381 can be accomplished by the same procedure.

In this way, in a data transmission and receiving apparatus according to the present invention, a recording medium descriptor is expressed using a list structure when accessing by way of a digital interface a recording medium to which is recorded AV data, text data such as titles for the AV data, or a text file such as lyrics for the AV data. For the list structure, an individual list is generated for the AV data descriptor, text data, and a text file descriptor, and a pointer to a list of related text data and text file descriptors is written to the AV data list object. If text data corresponding to the AV data is not recorded to the recording medium at this time, the objects in the lists for the text data, etc., are left empty.

By using a data transmission and receiving apparatus according to the present invention in this way, text files and text information that are attribute data of the AV data can be accessed from an external device by following links from the AV data descriptor. In addition, because text information and text files are written using the same structure, text information and text files can be accessed from an external device using the same procedure, and access from an external device can be simplified. Furthermore, because empty objects are generated even if the title or other text information is not recorded to the recording medium at this time, the write location can be determined in advance when an external device newly writes a title or other information.

Embodiment 4

Figure 8:
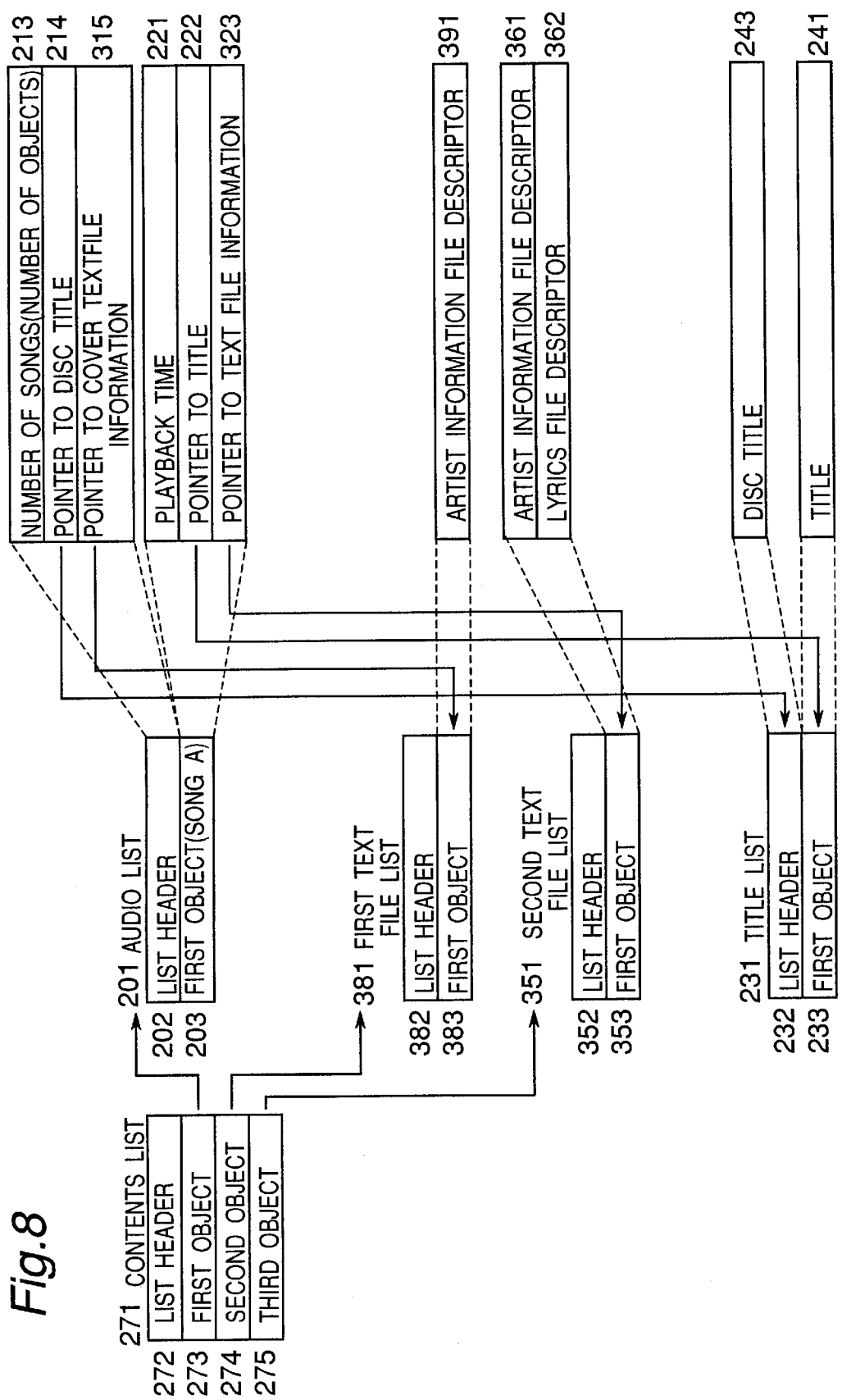
FIG. 8 is a schematic diagram of the list structure in a data transmission and receiving apparatus and method according to a fourth embodiment of the present invention.

A data transmission and receiving apparatus according to a fourth embodiment of the present invention is described with reference to FIG. 1, FIG. 4 and FIG. 8. This embodiment of the present invention is an example of a data transmission and receiving apparatus and method according to a fourth aspect of the present invention.

The basic operation of the data transmission and receiving apparatus in FIG. 1 is the same as that of the second embodiment. It is further assumed that the same data as the second embodiment is recorded to the optical disc 107. That is, the list structure generated by the list conversion unit 109 is initially as shown in FIG. 4.

The operation of the data transmission and receiving apparatus when song B is deleted is described here. In this case, the second object 204 of the audio list 201, that is, the object corresponding to song B, is deleted. As a result, the content of the second object 204, that is, playback time 224, pointer 225 to the title, and pointer 326 to the text file information, are also deleted. Then, the destination to which the title pointer 225 points, that is, second object 234 of title list 231, and the destination to which the text file information pointer 326 points, that is, the second object 354 of the second text file list 351, are also deleted. Deleting these objects means deleting the lyrics file descriptor 364 and the artist information file descriptor 363. As a result of the above operation in the data transmission and receiving apparatus, the list structure generated by the list conversion unit 109 after song B is deleted is as shown in FIG. 8.

In this way, in a data transmission and receiving apparatus according to the present invention, a recording medium descriptor is expressed with a list structure when accessing by way of a digital interface a recording medium to which is recorded AV data, text data such as titles for the AV data, or a text file such as lyrics for the AV data. For the list structure, an individual list is generated for the AV data descriptor, text data, and a text file descriptor, and a pointer to a list of related text data and text file descriptors is written to the AV data list object. Then, when AV data is deleted, the object(s) in the title list and object(s) in the text file linked from the object corresponding to the deleted AV data are deleted at the same time.

By using a data transmission and receiving apparatus according to the present invention in this way, text files and text information that are attribute data of the AV data can be accessed from an external device by following links from the AV data descriptor. In addition, because text information and text files are written using the same structure, text information and text files can be accessed from an external device using the same procedure, and access from an external device can be simplified. Furthermore, when AV data is deleted in this case, it is not necessary for the external device to delete the descriptor corresponding to the deleted AV data or descriptor (text information or text file) because objects in the title list and objects in the text files linked from the object corresponding to the deleted AV data are deleted at the same time, and uniform list management can be facilitated. In addition, content recorded to the recording medium can be immediately reflected in the list.

Embodiment 5

Figure 9:
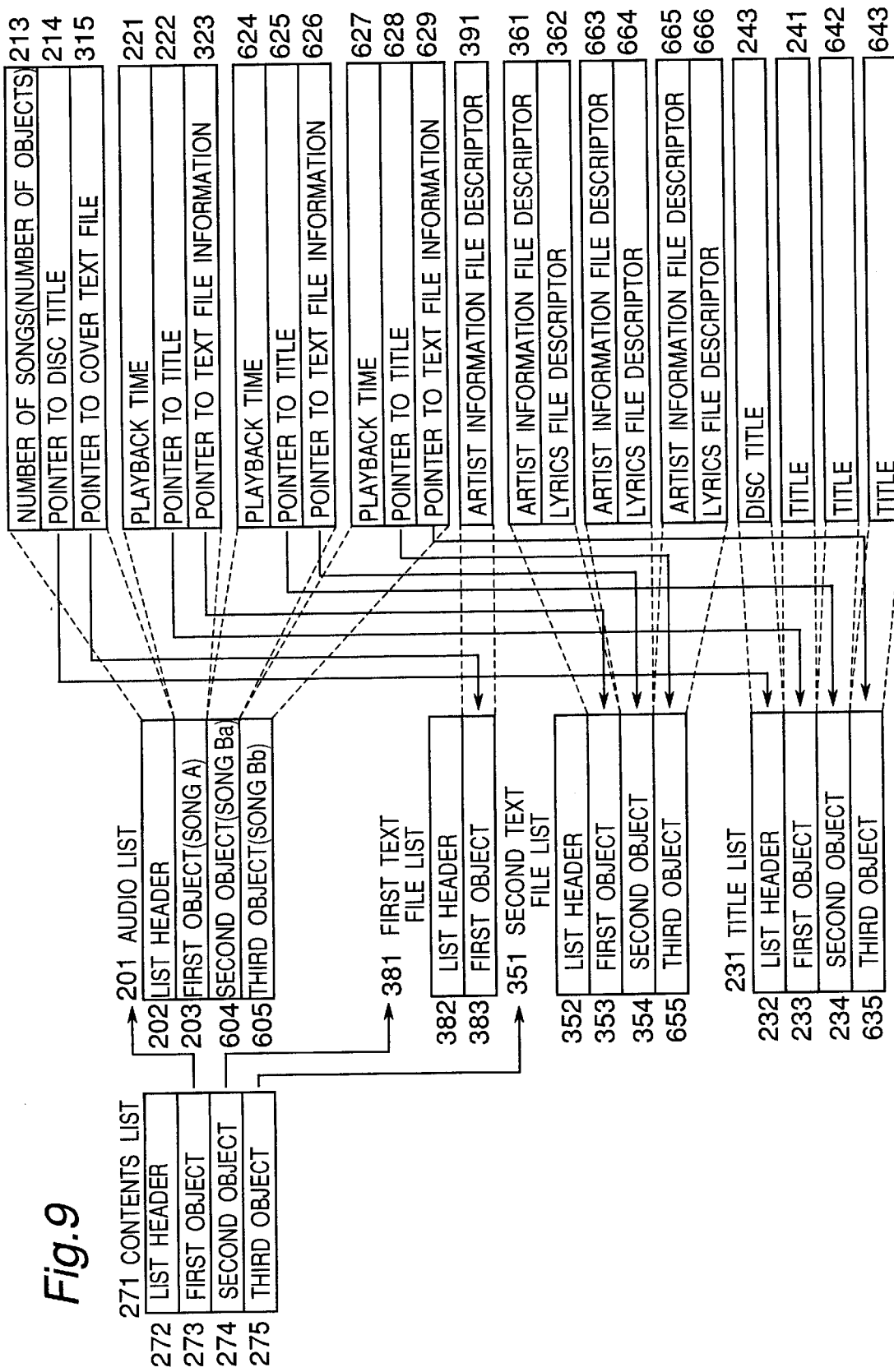
FIG. 9 is a schematic diagram of the list structure in a data transmission and receiving apparatus and method according to a fifth embodiment of the present invention.

A data transmission and receiving apparatus according to a fifth embodiment of the present invention is described with reference to FIG. 1, FIG. 4 and FIG. 9. This embodiment of the present invention is an example of a data transmission and receiving apparatus and method according to a fifth aspect of the present invention.

The basic operation of the data transmission and receiving apparatus in FIG. 1 is the same as that of the first embodiment. It is further assumed that the same data as in the first embodiment is recorded to the optical disc 107. That is, the list structure generated by the list conversion unit 109 is initially as shown in FIG. 4.

The operation of the data transmission and receiving apparatus is described here for a case in which song B is divided into a song Ba and a song Bb. In this case, the second object 204 of audio list 201, that is, the object corresponding to song B, is divided in two, becoming second object 604 and third object 605. The structure of the second object 604 is the same as the second object 204 before it is divided. However, playback time 624 is shorter by the amount removed.

Furthermore, like the first object 203 and second object 604, the newly generated third object 605 comprises playback time 627, title pointer 628, and text file information pointer 629.

A third object 635 is newly generated in title list 231, and a pointer (ID) to the third object 635 of title list 231 is written to the title pointer 628. The content of third object 635 of title list 231 is the title 643 of song Bb. The content of title 643 when the object is divided can be either simply copied from the tile of song B, empty, or otherwise.

In addition, a new third object 655 is generated in second text file list 351, and a pointer (ID) to the third object 655 of second text file list 351 is written to the pointer 629 to the title. The content of the third object 655 of second text file list 351 is the same as first object 353 and second object 354, and consists of lyrics file descriptor 665 and artist information file descriptor 666 for song Bb. The lyrics file (the text file itself) for song Bb when song B is divided can be, for example, an empty file, or a file containing the lyrics data from the time point at which song B was divided. More specifically, if the lyrics file is a file of a format containing time information for the lyrics, the lyrics file can be divided into two files based on that time information. For example, if song B has a length of 180 (s) before it is divided and it is divided into a song Bb of 60 (s) from the beginning and a song Bb of the remaining 120 (s), the lyrics file can be also divided into a lyrics file for song Ba to time information 60 (s), and a lyrics file of song Bb from 60 (s) with the new lyrics file descriptor written to lyrics file descriptor 664 and 666.

Furthermore, the artist information file (the text file itself) for song Bb at the time point at which song B is divided can be, for example, a copy of the artist information file for song B or left empty. The content (the file size, for example) of the lyrics file descriptor 665 or artist information file descriptor 666 corresponding to song Bb is determined by the state of this text file.

In this way, in a data transmission and receiving apparatus according to the present invention, a recording medium descriptor is expressed using a list structure when accessing by way of a digital interface a recording medium to which is recorded AV data, text data such as titles for the AV data, or a text file such as lyrics for the AV data. For the list structure, an individual list is generated for the AV data descriptor, text data, and a text file descriptor, and a pointer to a list of related text data and text file descriptors is written to the AV data list object. Then, when AV data is divided, a descriptor for the text data and text file corresponding to the divided newly generated AV data is added to the text data and text file descriptor list as a new object. Then, link information to the newly generated text data and text file descriptor object is written to the object corresponding to the newly generated AV data.

By using a data transmission and receiving apparatus according to the present invention in this way, text files and text information that are attribute data of the AV data can be accessed from an external device by following links from the AV data descriptor. In addition, because text information and text files are written using the same structure, text information and text files can be accessed from an external device using the same procedure, and access from an external device can be simplified. Furthermore, when AV data is divided, an object in the title list and an object in the text file are generated for the divided newly generated AV data, and a link is made from the newly generated AV data object. Therefore, even when AV data recorded to a recording medium is divided by a command from an external device, it is not necessary for the external device to generate a descriptor for the newly generated AV data or objects corresponding to the descriptor (text information and text file), and uniform list management and simplified processing can be promoted.

Embodiment 6

A data transmission and receiving apparatus according to a sixth embodiment of the present invention is described with reference to FIG. 1 and FIG. 10. This embodiment of the present invention is an example of a data transmission and receiving apparatus and method according to a sixth aspect of the present invention. The basic operation of the data transmission and receiving apparatus in FIG. 1 is the same as that of the first embodiment. In the following description, a still image is used as an example of a content block, a first still image list as a first list, and a second still image list as a second list.

It is here assumed that audio data (songs A, B) and still image data (A to C) are recorded to optical disc 107. The structure of the list generated by list conversion unit 109 is shown in FIG. 10. FIG. 10 is a schematic diagram showing the structure of contents list 271, audio list 201, and still image list 631.

The contents list 271 is a list of the entire content recorded to optical disc 107. The contents list 271 contains first to third objects 273 to 275. First to third objects 273 to 275 are directory objects, and respectively have audio list 201, first still image file list 781, and second still image file list 751 as a list one hierarchical level lower.

The audio list 201 consists of a list header 202, first object 203, and second object 204. In this example first object 203 and second object 204 correspond respectively to descriptor for songs A and B. The list header 202 comprises the number of objects 213. In this example there are two songs.

First object 203 and second object 204 respectively comprise descriptors (e.g., playback time, date and time of recording, data format) 221 and 224 for the respective songs A and B.

The first still image file list 781 comprises list header 782 and first object 783. First object 753 corresponds to still image A, and contains still image A descriptor (e.g., data size, data format) 791. Still image A for which a descriptor is contained as a first object is a still image representative of the overall disc, such as a jacket picture. A still image such as this is used for reproduction when the disc is stopped, for example. It should be noted that while the first still image file list 781 is shown here having only one object, the number of objects is determined by the number of still images recorded to disc representing the disc overall.

It should be noted that if there is no still image data representing the recording content, first still image file list 781 prepares at least one empty object.

The second still image file list 751 comprises list header 752, first object 753, and second object 754. First object 753 and second object 754 correspond respectively to still images B, C. First object 753 and second object 754 also contain a descriptor (e.g., data size, data format) 761, 763 for still images B, C, respectively.

As a result, because a descriptor relating to a still image file representing the entire disc is written to first still image file list 781, when a still image file descriptor representing the disc overall is accessed from an external device, the contents list 271 is read and the ID of the first still image list 781 is read, and then the first still image list 781 is accessed. In addition, to reproduce data from a still image file representing the overall disc, contents list 271 is read and the ID of still image list 781 is read, then still image list 631 is specified, and a reproduce command (data output command) is sent to the data transmission and receiving apparatus from the external device.

Accessing each of the still images can be accomplished using the same procedure.

In this way, in a data transmission and receiving apparatus according to the present invention, a recording medium descriptor is expressed with a list structure when accessing by way of a digital interface a recording medium to which AV data and still image data, for example, are recorded. For the list structure, individual lists are generated for the descriptors of the AV data, still image data representing the disc, and other still image data.

Furthermore, when a playback command specifying an AV data list is sent from an external device, playback starts from the AV data corresponding to the first object at the beginning of the AV data list.

By using a data transmission and receiving apparatus according to the present invention in this way, data blocks not associated with AV data can be managed using the same method described in the second embodiment for data associated with AV data, list structure uniformity can be facilitated, and access can be simplified when accessing this data or data descriptor from an external device.

Furthermore, by using a data transmission and receiving apparatus according to the present invention, synchronized playback of AV data, data associated therewith, and data not associated therewith can be easily accomplished because the list formats are the same.

An example of this is described below.

Figure 10:
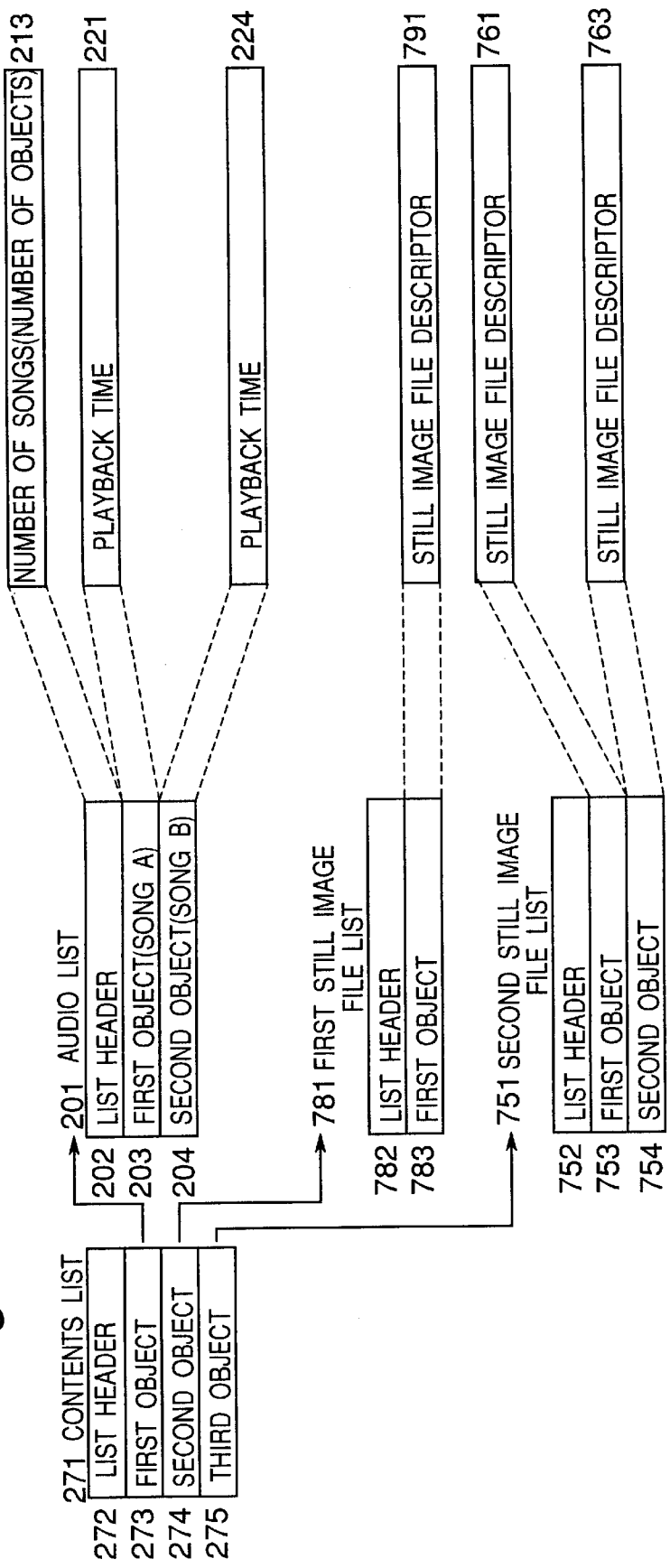
FIG. 10 is a schematic diagram of the list structure in a data transmission and receiving apparatus and method according to a sixth embodiment of the present invention.
Figure 11:
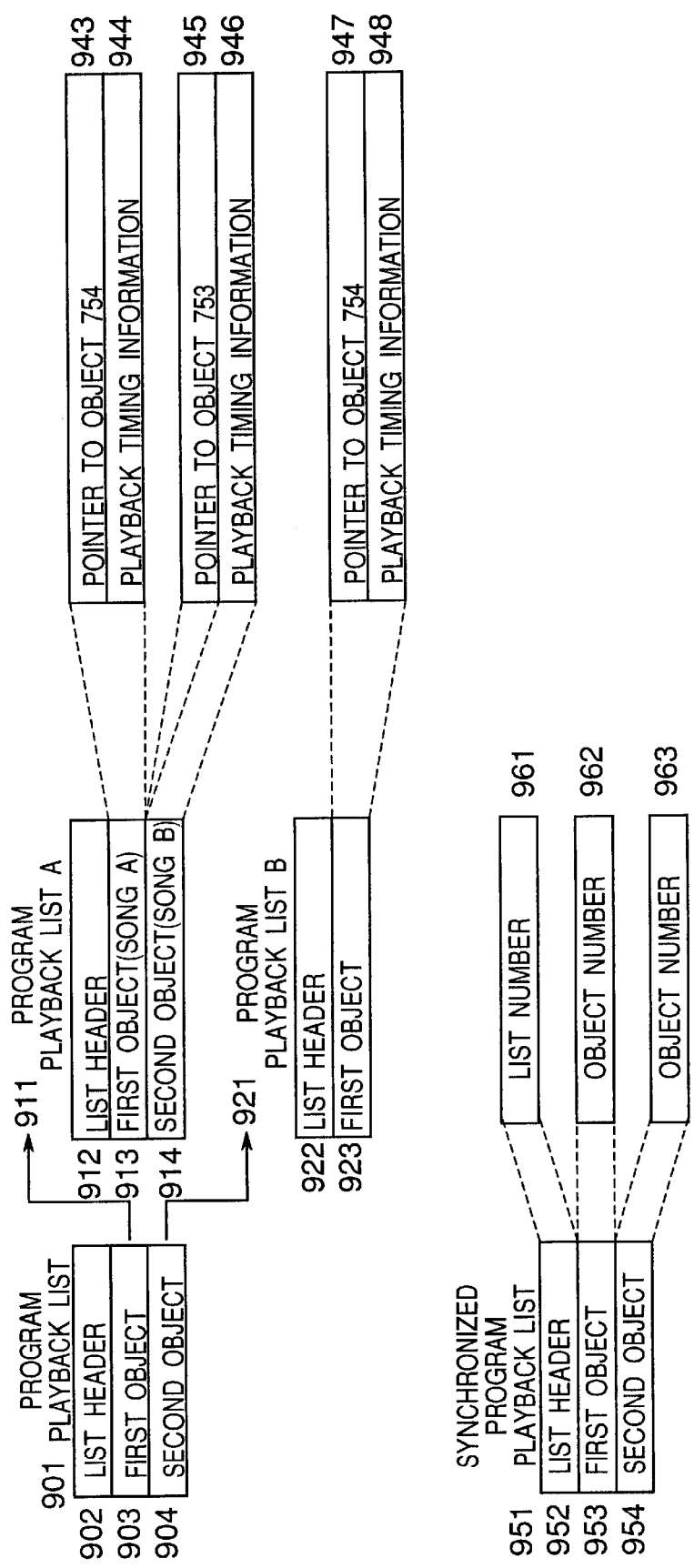
FIG. 11 is a schematic diagram of the list structure in the same data transmission and receiving apparatus and method.

The structure of a list that list conversion unit 109 generates using the data transmission and receiving apparatus shown in FIG. 1 is shown in FIG. 4, but the still image list is as shown in FIG. 10. Moreover, in addition to the lists shown in FIGS. 4 and 10, the list conversion unit 109 generates the program playback list 901 and synchronized program playback list 951 in FIG. 11.

The program playback list 901 is a list for writing the playback timing of still image data for audio data.

The program playback list 901 comprises a list header 902, first object 903, and second object 904. First object 903 and second object 904 are here directory objects, and. respectively have program playback list A911 and program playback list B921, which are lower level lists.

Program playback list A911, a list at a level lower than list header 902 of program playback list 901, consists of a list header 912, first object 913, and second object 914. Information for a still image (still image A, B) to be reproduced synchronized to first object 203 (song A) of audio list 201 is written in these. Specifically, these are a pointer to object 753 corresponding to still image A and object 754 corresponding to still image B. It is here assumed that a descriptor is written to optical disc 107 so that still images B, A are presented for song A at a certain timing as shown in FIG. 12.

Information for a still image (still image A) to be reproduced synchronized to second object 204 (song B) of audio list 201 is written to program playback list B921. That is, a pointer, 948, to a descriptor (object 754) for still image A is written to first object 923.

The synchronized program playback list 951 is a list for indicating that audio data, still image data, or a text file, for example, are reproduced synchronized. The synchronized program playback list 951 consists of a list header 952, first object 953, and second object 954. The number of a list to be reproduced synchronized is specified in list header 952. Because audio list 201, second text file list 351, and program playback list 901 are to be reproduced synchronized here, the number of these three lists are written to list number 961. The numbers of the objects written in the three lists are specified in first object 953 and second object 954. Because these are recorded to disc to accomplish reproduction as shown in FIG. 12, object number 1 is written to first object 953, and object number 2 is written to second object 954.

Figure 12:
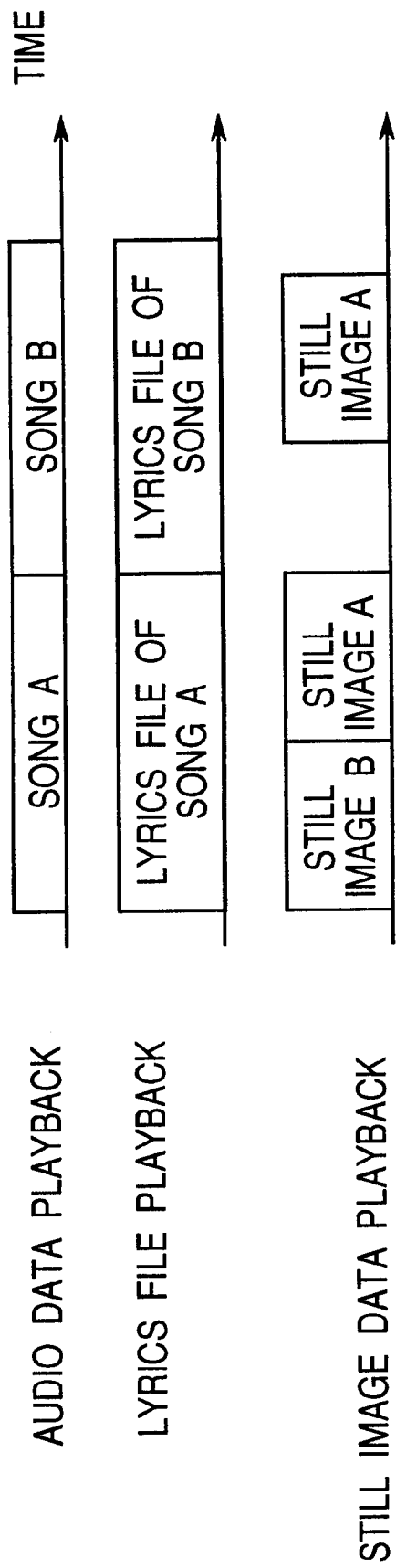
FIG. 12 is a schematic diagram showing an example of synchronization reproduction in the same data transmission and receiving apparatus and method.
Figure 13:
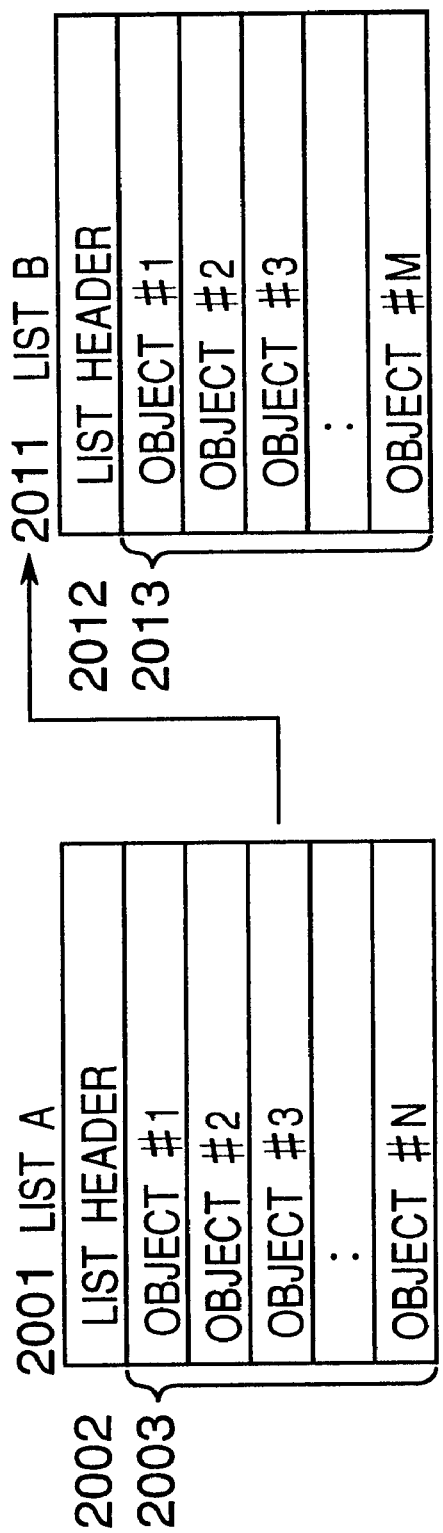
FIG. 13 is a schematic diagram showing the list structure in a conventional data transmission and receiving method.
Figure 14:
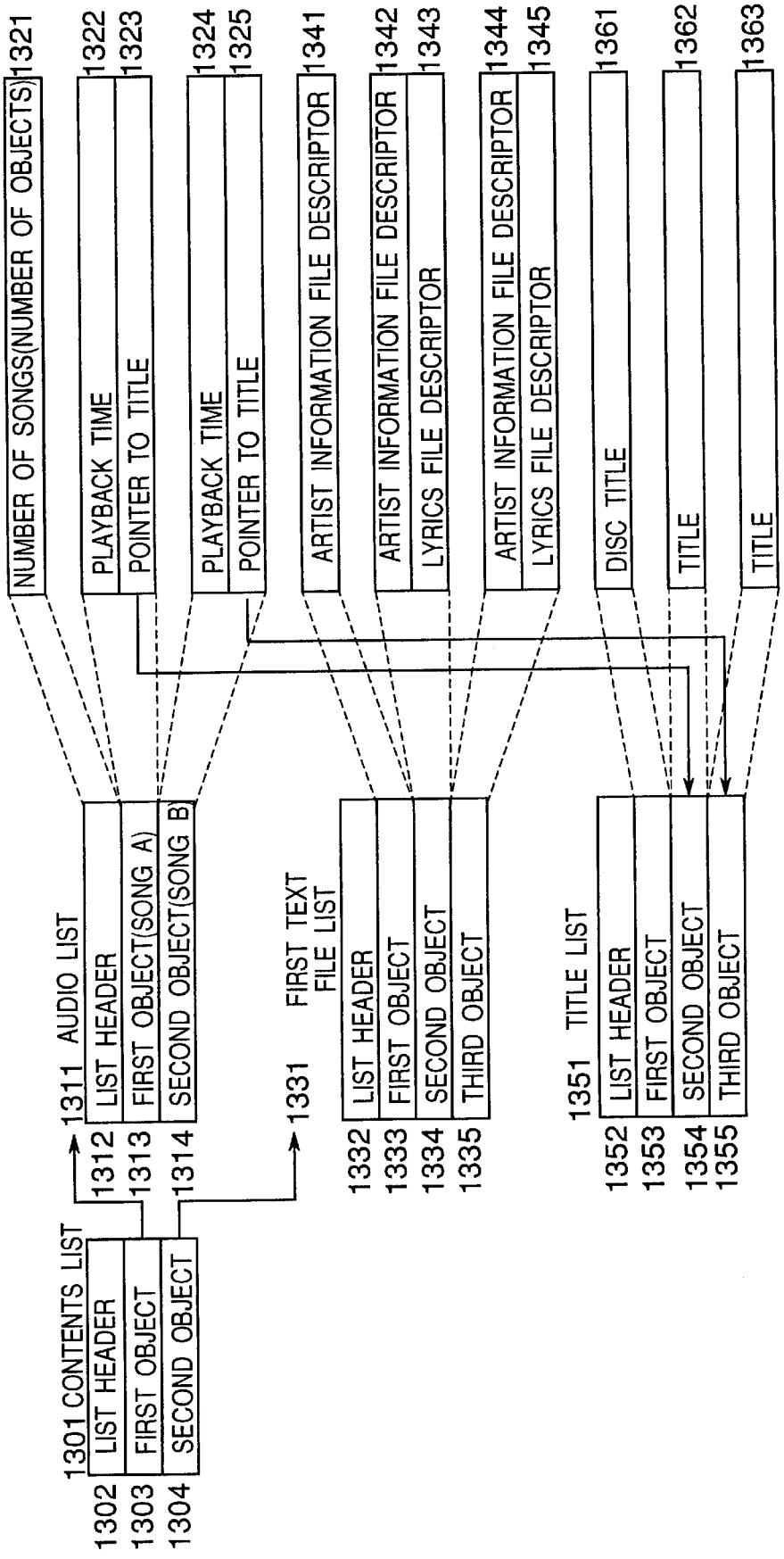
FIG. 14 is a schematic diagram showing a specific list structure in a conventional data transmission and receiving method.

When synchronized program playback list 951 is specified and a playback command is sent to the data transmission and receiving apparatus, the data transmission and receiving apparatus determines from the list header 952 of synchronized program playback list 951 that the list is to be reproduced synchronized, and reproduction of audio data, still image data, and lyrics file is accomplished as shown in FIG. 12 in a sequence and playback timing written to each list.

In addition, to change the still image data playback timing, for example, in FIG. 12 from an external device, a change is made to the program playback list 901.

In this way, in a data transmission and receiving apparatus according to the present invention, a recording medium descriptor is expressed using a list structure when accessing by way of a digital interface a recording medium to which is recorded AV data, still image data, or a text file such as lyrics for the AV data. For the list structure, individual lists are generated for the AV data, still image data descriptor, and a text file descriptor. Then, at what timing and for what period still image data is presented during AV data reproduction is written as a program playback list, and when a playback command for reproducing an AV data list, text file list, and program playback list synchronized is received from an external device, AV data, still image data, and text file are reproduced synchronized. The same still image list and text list can be used for synchronized playback and non-synchronized playback.

It should be noted that an optical disc has been used by way of example as the recording medium in the preferred embodiments of the present invention, but if the recording medium records descriptors and data descriptors, the recording medium can be, for example, a magnetic disc, magnetic tape, or semiconductor memory.

Furthermore, in the preferred embodiments of the present invention the recording medium has been described for handling audio data as the AV data content, but the recording medium can be for handling video data or still images.

Furthermore, in the preferred embodiment of the invention a configuration in which descriptors stored to the data storage unit 104 are converted by the list conversion unit 109 to a list when an external device accesses the descriptor, but the descriptors can be already stored in a list structure to the data storage unit 104.

Furthermore, text information and text files were given as examples of an AV data descriptor and described with these presented in a list structure (title list 231, first and second text file lists 381, 351), but other types of descriptors can be used.

Furthermore, a lyrics file and an artist information file were given as examples of text files in these preferred embodiments of the invention, but these can be other types of text files.

Furthermore, in the preferred embodiments of the invention, audio list 201 and first and second text file lists 381, 351 are described as lists at a level below contents list 271, but other structures can be used. For example, there are cases in which only audio list 201 and second text file list 351 are lists at a level below contents list 271, and title list 231 is a list at the same hierarchical level as the contents list.

Furthermore, in the preferred embodiments of the invention, lyrics file attribute information and artist information file attribute information are both written to a text file list object, but by using a directory object these can be expressed as individual objects. By making these individual objects, data playback and output can be individually controlled.

What is claimed is:

1. A data transmission and receiving apparatus for sending and receiving data through an intervening digital interface, the data transmission and receiving apparatus comprising:

a data storage means for accumulating a first descriptor, which is a descriptor for a first content block recorded to a recording medium, and a second descriptor, which is a descriptor for a second content block associated with the first content block, wherein a descriptor is expressed by a list structure generated for an AV data descriptor and a text data descriptor, and a pointer to a related text data descriptor is written to an AV data list object, wherein a text information, which is an attribute data of AV data, can be accessed from an external device by following links from the AV data descriptor, a list conversion means for mutually converting a list and the first and second descriptors stored by the data storage means, and a data transmission and receiving means for sending and receiving the list converted by the list conversion means through the digital interface, wherein the list conversion means groups the first descriptor into a third descriptor expressed independently of the first content block, and a fourth descriptor other than the third descriptor, divides the second, third, and fourth descriptors respectively into object units corresponding to individual pieces of content, generates a first list consisting of a fourth descriptor object block, a second list consisting of a descriptor object clock, a third list consisting of an object representing a content block in the second descriptor object block, and a fourth list consisting of other objects, and writes to an object in first list link information to an object in the second list containing the third descriptor for content corresponding to an object in the first list, and an object in the fourth list containing the second descriptor for content corresponding to an object in the first list.

2. The data transmission and receiving apparatus according to claim 1, wherein the list conversion means further generates an empty object when one of the second, third and fourth descriptors does not exist at the separation.

3. The data transmission and receiving apparatus according to claim 1, wherein the list conversion means, when a first content in the content block is deleted, further deletes the object in the first list indicating the first content descriptor, and the object in the second list and the object in the fourth list linked from the object in the first list.

4. The data transmission and receiving apparatus according to claim 1, wherein the list conversion means, when a first content in the content block is divided, divides a first object in the first list indicating the fourth descriptor for the first content into second and third objects divides an object in the second list linked from the first object into fourth and fifth objects, divides an object in the fourth list linked from the first object into sixth and seventh objects, writes link information to the fourth and sixth objects in the second object, and writes link information to the fifth and seventh objects in the third object.

5. A data transmission and receiving apparatus as described in claim 5, wherein the fourth or fifth object is a copy of the object in the second list before division.

6. A data transmission and receiving apparatus as described in claim 4, wherein the sixth or seventh object is a copy of the object in the third list before division.

7. A data transmission and receiving apparatus as described in claim 4, wherein the fourth, fifth, sixth or seventh object is empty.

8. A data transmission and receiving apparatus as described in any of claim 1, wherein link information to a third list is written to the list header of the first list.

9. A data transmission and receiving apparatus as described in claim 1, wherein the content block is one of audio data and video data.

10. A data transmission and receiving apparatus as described in claim 1, wherein the third descriptor is one of a content title and other text information.

11. A data transmission and receiving apparatus as described in claim 1, wherein an associated content is one of a still image and a text file.

12. A data transmission and receiving apparatus for sending and receiving data through an intervening digital interface, the data transmission and receiving apparatus comprising:

a data storage means for accumulating descriptors of a content block recorded to a recording medium, wherein a descriptor is expressed by a list structure generated for an AV data descriptor and a text data descriptor, and a pointer to a related text data descriptor is written to an AV data list object, wherein a text information which is an attribute data of AV data can be accessed from an external device by following links from the AV data descriptor, a list conversion means for mutually converting a list and the descriptors stored by the data storage means, and a data transmission and receiving means for sending and receiving the list converted by the list conversion means through the digital interface;

wherein the list conversion means groups the descriptors into object units corresponding to individual pieces of content, and generates a first list consisting of an object block of descriptors corresponding to content representing the content block, and a second list consisting of an object block of other descriptor.

13. A data transmission and receiving apparatus a s described in claim 12, wherein the content is still image. data, and content representing the content block is a cover picture.

14. A data transmission and receiving apparatus as described in claim 12, wherein the content is a text file.

15. A data transmission and receiving apparatus for sending and receiving data through an intervening digital interface, the data transmission and receiving apparatus comprising:

a data storage means for accumulating descriptors of a content block recorded to a recording medium, wherein a descriptor is expressed by a list structure generated for an AV data descriptor and a text data descriptor, and a pointer to a related text data descriptor is written to an AV data list object, wherein a text information which is an attribute data of AV data can be accessed from an external device by following links from the AV data descriptor, a list conversion means for mutually converting a list and the descriptors stored by the data storage means, and a data transmission and receiving means for sending and receiving the list converted by the list conversion means through the digital interface, wherein the list conversion means groups the descriptors into object units corresponding to individual pieces of content, and when content representing the content block does not exist, generates a first list of which the object is an empty object, and a second list consisting of a descriptor object block.

16. A data transmission and receiving apparatus as described in claim 15, wherein the content is audio data or video data.

17. The data transmission and receiving apparatus as described in claim 1, wherein the recording medium is an optical disc.

18. A data transmission and receiving method for sending and receiving data through an intervening digital interface, the data transmission and receiving method comprising:

a data storage step for accumulating a first descriptor, which is a descriptor for a first content block recorded to a recording medium, and a second descriptor, which is a descriptor for a second content block associated with the first content block, wherein a descriptor is expressed by a list structure generated for an AV data descriptor and a text data descriptor, and a pointer to a related text data descriptor is written to an AV data list object, wherein a text information which is an attribute data of AV data can be accessed from an external device by following links from the AV data descriptor, a list conversion step for mutually converting a list and the first and second descriptors stored by the data storage step, and a data transmission and receiving step for sending and receiving the list converted by the list conversion step through the digital interface;

wherein the list conversion step groups the first descriptor into a third descriptor expressed independently of the first content block, and a fourth descriptor other than the third descriptor, respectively divides the second, third, and fourth descriptors into object units corresponding to individual pieces of content, generates a first list consisting of a fourth descriptor object block, a second list consisting of a descriptor object clock, a third list consisting of an object representing a content block in the second descriptor object block, and a fourth list consisting of other objects, and writes to an object in first list link information to an object in the second list containing the third descriptor for content corresponding to an object in the first list, and an object in the fourth list containing the second descriptor for content corresponding to an object in the first list.

19. The data transmission and receiving method according to claim 18, wherein the list conversion step further generates an empty object when one of the second, third and fourth descriptors does not exist at the separation.

20. The data transmission and receiving method according to claim 18, wherein the list conversion step, when a first content in the content block is deleted, further deletes the object in the first list indicating the first content descriptor, and the object in the second list and the object in the fourth list linked from the object in the first list.

21. The data transmission and receiving method according to claim 18, wherein the list conversion step, further, when a first content in the content block is divided, divides a first object in the first list indicating the fourth descriptor for the first content into second and third objects divides an object in the second list linked from the first object into fourth and fifth objects, divides an object in the fourth list linked from the first object into sixth and seventh objects, writes link information to the fourth and sixth objects in the second object, and writes link information to the fifth and seventh objects in the third object.

22. A data transmission and receiving method as described in claim 21, wherein the fourth or fifth object is a copy of the object in the second list before division.

23. A data transmission and receiving method as described in claim 21, wherein the sixth or seventh object is a copy of the object in the third list before division.

24. A data transmission and receiving method as described in claim 21, wherein the fourth, fifth, sixth or seventh object is empty.

25. A data transmission and receiving method as described in claim 18, wherein link information to a third list is written to the list header of the first list.

26. The data transmission and receiving method as described in claim 18, wherein the content block is one of audio data and video data.

27. The data transmission and receiving method as described in claim 18, wherein the third descriptor is one of a content title and other text information.

28. The data transmission and receiving method as described in claim 28, wherein an associated content is one of a still image and a text file.

29. A data transmission and receiving method for sending and receiving data through an intervening digital interface, the data transmission and receiving method comprising:

a data storage step for accumulating descriptors of a content block recorded to a recording medium, wherein a descriptor is expressed by a list structure generated for an AV data descriptor and a text data descriptor, and a pointer to a related text data descriptor is written to an AV data list object, wherein a text information which is an attribute data of AV data can be accessed from an external device by following links from the AV data descriptor, a list conversion step for mutually converting a list and the descriptors stored by the data storage step, and a data transmission and receiving step for sending and receiving the list converted by the list conversion step through the digital interface;

wherein the list conversion step groups the descriptors into object units corresponding to individual pieces of content, and generates a first list consisting of an object block of descriptors corresponding to content representing the content block, and a second list consisting of an object block of other descriptor.

30. A data transmission and receiving method as described in claim 29, wherein the content is still image data, and content representing the content block is a cover picture.

31. A data transmission and receiving method as described in claim 29, wherein the content is a text file.

32. A data transmission and receiving method for sending and receiving data through an intervening digital interface, the data transmission and receiving method comprising:

a data storage step for accumulating descriptors of a content block recorded to a recording medium, wherein a descriptor is expressed by a list structure generated for an AV data descriptor and a text data descriptor, and a pointer to a related text data descriptor is written to an AV data list object, wherein a text information which is an attribute data of AV data can be accessed from an external device by following links from the AV data descriptor, a list conversion step for mutually converting a list and the descriptors stored by the data storage step, and a data transmission and receiving step for sending and receiving the list converted by the list conversion step through the digital interface;

wherein the list conversion step groups the descriptors into object units corresponding to individual pieces of content, and when content representing the content block does not exist, generates a first list of which the object is an empty object, and a second list consisting of a descriptor object block.

33. A data transmission and receiving method as described in claim 32, wherein the content is audio data or video data.

34. The data transmission and receiving method as described in claim 18, wherein the recording medium is an optical disc.

* * * * *

UNITED STATES PATENT AND TRADEMARK OFFICE
CERTIFICATE OF CORRECTION

PATENT NO.    : 6,429,364 B1
DATED         : August 6, 2002
INVENTOR(S)   : K. Muraki et al.

It is certified that error appears in the above-identified patent and that said Letters Patent is hereby corrected as shown below:

Column 21,
Line 57, delete "any of".

Column 22,
Line 27, "a s" should be -- as --.
Line 28, after "image" delete ".".

Column 24,
Line 14, "claim 28" should be -- claim 18 --.

Signed and Sealed this

Twenty-seventh Day of May, 2003

JAMES E. ROGAN
*Director of the United States Patent and Trademark Office*